(12) United States Patent
Ito et al.

(10) Patent No.: US 7,935,293 B2
(45) Date of Patent: May 3, 2011

(54) INJECTION MOLDING METHOD AND INJECTION MOLDING APPARATUS

(75) Inventors: Tatsuo Ito, Aichi-ken (JP); Daiichiro Kawashima, Aichi-ken (JP); Kazuo Takeda, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 840 days.

(21) Appl. No.: 11/604,869

(22) Filed: Nov. 28, 2006

(65) Prior Publication Data

US 2007/0120296 A1 May 31, 2007

(30) Foreign Application Priority Data

Nov. 30, 2005 (JP) .................................. 2005-345555
Nov. 30, 2005 (JP) .................................. 2005-345556

(51) Int. Cl.
B29C 45/00 (2006.01)
(52) U.S. Cl. .................... 264/319; 264/40.3; 264/328.1; 264/500
(58) Field of Classification Search ............... 264/328.1, 264/328.12, 328.13, 328.7, 328.8, 85, 537, 264/40.3, 500; 425/546
See application file for complete search history.

(56) References Cited

U.S. PATENT DOCUMENTS

| | | | | |
|---|---|---|---|---|
| 5,198,240 A * | 3/1993 | Baxi | ............................. | 425/145 |
| 5,344,596 A * | 9/1994 | Hendry | ........................ | 264/40.3 |
| 5,439,365 A * | 8/1995 | Hendry | .......................... | 425/130 |
| 5,542,611 A * | 8/1996 | Hendry | ........................ | 239/553.5 |
| 5,716,560 A * | 2/1998 | Heuchert et al. | ........... | 264/37.17 |
| 6,403,014 B1 * | 6/2002 | Hendry et al. | ................. | 264/500 |
| 7,582,250 B2 * | 9/2009 | Uchida et al. | .................. | 264/572 |
| 2003/0224080 A1 * | 12/2003 | Thomas | ......................... | 425/130 |
| 2004/0004313 A1 * | 1/2004 | Thomas | ........................ | 264/572 |
| 2004/0191475 A1 * | 9/2004 | Murayama | ..................... | 428/137 |

FOREIGN PATENT DOCUMENTS

| | | |
|---|---|---|
| JP | A-59-220337 | 12/1984 |
| JP | A-63-281818 | 11/1988 |
| JP | A-06-23781 | 2/1994 |
| JP | A-07-223246 | 8/1995 |

(Continued)

OTHER PUBLICATIONS

Notification of Reason for Refusal issued from the Japanese Patent Office dated Jul. 16, 2010 in the corresponding Japanese patent application No. 2005-345555 (a copy and English translation thereof).

(Continued)

Primary Examiner — Kat Wyrozebski
Assistant Examiner — Daniel Lee
(74) Attorney, Agent, or Firm — Posz Law Group, PLC

(57) ABSTRACT

An injection molding apparatus includes a forming mold provided with a gas inlet through which a gas is introduced into an area between a rear molding surface in a cavity and a resin material inside the cavity. A plurality of the gas inlets is provided along a passage direction of the resin material in the cavity. In injection molding the resin molded article, a molten resin material is introduced into the cavity from a resin inlet and, when filling the inside of the cavity with the resin material, the introduction of the gas is sequentially started, beginning with a gas inlet provided in an area inside the cavity which is first filled with the resin material, thereby sequentially pressing the relevant resin material against a front molding surface of the cavity.

3 Claims, 18 Drawing Sheets

FOREIGN PATENT DOCUMENTS

| | | |
|---|---|---|
| JP | A-08-72109 | 3/1996 |
| JP | A-08-281685 | 10/1996 |
| JP | A-09-76247 | 3/1997 |
| JP | A-9-109213 | 4/1997 |
| JP | A-10-86169 | 4/1998 |
| JP | A-2000-280830 | 10/2000 |
| JP | A-2000-289046 | 10/2000 |
| JP | A-2002-283415 | 10/2002 |
| JP | A-2005-28731 | 2/2005 |

OTHER PUBLICATIONS

Notification of Reason for Refusal issued from the Japanese Patent Office dated Jul. 16, 2010 in the corresponding Japanese patent application No. 2005-345556 (a copy and English translation thereof).

* cited by examiner

INJECTION MOLDING METHOD AND INJECTION MOLDING APPARATUS

BACKGROUND OF THE INVENTION

1. Field of the Invention

The present invention relates to an injection molding method and injection molding apparatus in which a resin molded article is obtained by injection molding a resin material.

2. Related Art

For example, in a resin molded article manufacturing method in Japanese Patent No. 3,611,058, in molding a molded article having a partial thick wall on a rear surface side, it is designed to prevent a shrink from occurring on a front surface side of the molded article.

That is, in Japanese Patent No. 3,611,058, in a cavity of a forming mold for molding the molded article, a pressurized fluid inlet is formed on the same side as a rear surface side on which the thick wall is molded. Also, on the rear surface side of the cavity, a portion corresponding to a base of the thick wall is formed using a heat insulating material.

Then, a cooling of a resin in the proximity of the base of the thick wall is more delayed by the heat insulating material than a cooling of a resin on the periphery of the resin, and the base of the thick wall and the proximity of the base are pressed against the front surface side of the cavity from the rear surface side of the cavity by a pressurized fluid which has been injected from the inlet into an area between the rear surface side of the molded article and the heat insulating material, thus preventing a shrink from occurring on the front surface side of the molded article.

However, in the existing injection molding technique, particularly, when molding a large-size resin molded article or a resin molded article having a length which is larger than a thickness or a width, in the event that a plurality of the pressurized fluid inlets (gas inlets) is provided along a passage direction of the resin in the cavity, it is not designed to prevent a shrink and the like from occurring on the front surface side of the molded article.

That is, when carrying out an injection molding of the large-size or long resin molded article, a certain amount of time (a few seconds) is required to cause a molten resin to reach a distal end of the cavity from a resin inlet (a resin inlet gate) in the cavity. At this time, in the event that, in the same way as in the existing technique, an introduction of a gas into the cavity from the inlet is carried out after the molten resin has reached the distal end of the cavity, a surface skin (a cured portion) formed on a surface of the molten resin which makes contact with the mold tool has grown considerably in the proximity of the resin inlet, leading to a reduction in effectiveness in preventing the shrink and the like.

Further, there is a case that a boss of circular cross-section is projected from a rear surface of a plate-like body in a resin molded article used as various component parts of an automobile in order to attach the resin molded article to another component member, or for strengthening purposes.

As a method for manufacturing a resin molded article including such a boss, there is, for example, one disclosed in JP-A-10-86169 and JP-A-2005-28731.

JP-A-10-86169 discloses that, in injection molding a resin molded article, when a molten resin to be formed into the resin molded article is cooling and curing, a compressed gas is supplied to an inside of a boss, and a portion of the molten resin near a base of the boss is pressed against a mold tool by the compressed gas. Also, JP-A-2005-28731 discloses that, in manufacturing a resin molded article provided with a boss, a tubular pin and an inner pin are disposed in an inner portion of a cavity forming the boss, and, a compressed gas is supplied from a gap between the tubular pin and the inner pin, thereby pressing a molten resin which has filled an inside of a cavity.

Then, in JP-A-10-86169 and JP-A-2005-28731, a state of strain such as a shrink (a dimple formed on a surface) is prevented from occurring on a front surface of a plate-like body opposite a rear surface on which the boss stands.

However, even the existing resin molded article manufacturing method does not suffice for effectively preventing a state of strain such as a shrink from occurring on a front surface of the resin molded article having the boss.

That is, in the existing resin molded article manufacturing method, only an inner bottom of the boss is pressed by the compressed gas, so it is possible to prevent a shrink or the like from occurring on the front surface corresponding to an inner portion of the boss, but the manufacturing method does not suffice for preventing the shrink or the like from occurring on the front surface corresponding to an outer portion of the boss. Also, when causing the compressed gas to press only the inner bottom of the boss, in some situations, there is a possibility that the compressed gas enters an inside of the molten resin, and forms a hollow portion inside the resin molded article.

SUMMARY OF THE INVENTION

The invention, having been conceived with such an existing problem in mind, has an object of providing an injection molding method and injection molding apparatus which can effectively prevent a state of strain such as a shrink (a dimple formed on a surface) from occurring on a whole of a front surface of a resin molded article, including a surface corresponding to a boss formation position.

A first aspect of the invention provides an injection molding method using a forming mold provided with a cavity which is filled with a resin material to obtain a resin molded article and a resin inlet through which the resin material is introduced into the cavity, wherein a plurality of gas inlets through which a gas is introduced are formed on a rear molding surface of the cavity for molding a rear surface of the resin molded article, and the gas is introduced into an area between the rear molding surface and the resin material inside the cavity, the injection molding method including the steps of:

introducing the resin material into the cavity from the resin inlet; and, pressing the resin material against a front molding surface of the cavity for molding a front surface of the resin molded article by introducing the gas to the gas inlets when the cavity is filled with the resin material, wherein a gas inlet positioned close to the resin inlet starts an introduction of the gas earlier than a gas inlet positioned far from the resin inlet.

In the injection molding method of this aspect of the invention, a forming mold provided with the plurality of gas inlets is used. Then, by devising a timing of ejecting the gas from each gas inlet, a state of strain such as a shrink is effectively prevented from occurring on the front surface of the resin molded article.

In injection molding the resin molded article, the resin material is introduced into the cavity from the resin inlet.

Then, when filling the inside of the cavity with the resin material, the gas inlet in a position inside the cavity which is close to the resin inlet (the gas inlet provided in an area inside the cavity which is first filled with the resin material) first starts the introduction of the gas into an area between the rear molding surface of the cavity and the resin material inside the cavity. By this configuration, the area inside the cavity which is first filled with the resin material first presses the resin material against the front molding surface of the cavity.

For that reason, in this aspect of the invention, a surface skin (a cured portion of the resin material) formed on a surface of a molten resin, which makes contact with a molding surface of the cavity, grows first in an area inside the cavity which is first filled with the resin material. At the same time, it is possible to first carry out the pressing of the resin material which has filled the area in which the surface skin grows first.

Therefore, according to the injection molding method of this aspect of the invention, it is possible to effectively prevent a state of strain such as a shrink (a dimple formed on a surface) from occurring on a whole of the front surface of the resin molded article.

A second aspect of the invention provides an injection molding method, using a forming mold provided with a cavity which is filled with a resin material to obtain a resin molded article and a resin inlet through which the resin material is introduced into the cavity, wherein one or a plurality of gas inlets through which a gas is introduced is formed on a rear molding surface of the cavity for molding a rear surface of the resin molded article and the gas is introduced into an area between the rear molding surface and the resin material inside the cavity, the injection molding method including the steps of:

introducing the resin material into the cavity from the resin inlet; and pressing the resin material against a front molding surface of the cavity for molding a front surface of the resin molded article by starting introducing the gas from at least one of the gas inlets while the resin material is flowing into the cavity.

In the injection molding method of this aspect of the invention, when the resin material is flowing inside the cavity, the introduction of the gas is started from at least one gas inlet.

For that reason, in this aspect of the invention, it is possible to press the resin material against the front molding surface of the cavity before a surface skin (a cured portion of the resin material) formed on a surface of a molten resin, which makes contact with a molding surface of the cavity, grows too much.

Therefore, according to the injection molding method of this aspect of the invention too, it is possible to effectively prevent a state of strain such as a shrink (a dimple formed on a surface) from occurring on the whole of the front surface of the resin molded article.

A third aspect of the invention provides an injection molding apparatus, including:

a forming mold provided with a cavity which is filled with a resin material to obtain a resin molded article and a resin inlet through which the resin material is introduced into the cavity, wherein, a gas inlet through which a gas is introduced is formed on a rear molding surface of the cavity for molding a rear surface of the resin molded article, and the gas is introduced into an area between the rear molding surface and the resin material inside the cavity, a plurality of the gas inlets are provided along a passage direction of the resin material in the cavity, and wherein the apparatus is configured such that the resin material is introduced into the cavity from the resin inlet, and an introduction of the gas through the plurality of gas inlets is sequentially started, beginning with the gas inlet provided in an area inside the cavity which is first filled with the resin material.

The injection molding apparatus of this aspect of the invention, including a forming mold provided with the plurality of gas inlets, is configured such that the introduction of the gas through the plurality of gas inlets is sequentially started, beginning with the gas inlet provided in an area inside the cavity which is first filled with the resin material.

By this configuration, in this aspect of the invention too, the resin material can be pressed against the front molding surface of the cavity, in order, starting with the area inside the cavity which is first filled with the resin material. Then, it is possible to first carry out the pressing of the resin material which has filled the area in which the surface skin grows first.

Therefore, according to the injection molding method of this aspect of the invention, it is possible to effectively prevent a state of strain such as a shrink from occurring on the whole of the front surface of the resin molded article.

In the first to third aspects of the invention, the resin molded article can be a radiator grille, a back garnish, a side molding, a wheel cover, an instrument panel or the like. Also, the gas injected into the forming mold can be air or a high pressure gas such as nitrogen.

Also, before a whole of the inside of the cavity is filled with the resin material, the introduction of the gas through the gas inlets can be sequentially started, beginning with the gas inlet formed in an area inside the cavity which is first filled with the resin material. In this case, effectiveness is especially increased when a size of the resin molded article is relatively large, and a period of time to fill the inside of the cavity with the resin material is relatively long.

Also, the introduction of the gas through the gas inlets can also be started immediately after the resin material fills up to each relevant gas inlet formation position inside the cavity.

Also, the introduction of the gas through the gas inlets can also be started from any plurality of gas inlets at one time. In this case too, by staggering timings of starting the introduction of the gas into an area between any plurality of gas inlets and the remaining gas inlets, it is possible to obtain the same working effect as the heretofore described one.

Also, when carrying out the introduction of the gas through the plurality of gas inlets, preferably, the gas inlet having first started the introduction of the gas keeps introducing the gas even when another gas inlet subsequently starts the introduction of the gas. Then, it is preferable that the introduction of the gas from the plurality of gas inlets continues for a prescribed period of time after the whole of the cavity is filled with the resin material.

Also, in the first aspect of the invention, it is preferable that the resin molded article includes a plate-like body and a standing wall standing from a rear surface of the plate-like body, the cavity includes a body cavity for molding the plate-like body and a standing wall cavity for molding the standing wall, the body cavity is formed with a plurality of closed spaces which are areas surrounded by the standing wall cavity, and a plurality of the gas inlets is provided corresponding to portions of the rear molding surface in the plurality of closed spaces, and that the resin material is introduced into the cavity from the resin inlet and, when filling an inside of each of the closed spaces with the relevant resin material, a gas inlet provided in the closed space positioned close to the resin inlet starts the introduction of the gas earlier than a gas inlet provided in the closed space positioned far from the resin inlet.

Also, in the third aspect of the invention, it is preferable that the resin molded article includes a plate-like body and a standing wall standing from a rear surface of the plate-like body, the cavity includes a body cavity for molding the plate-like body and a standing wall cavity for molding the standing wall, the body cavity is formed with a plurality of closed spaces which are areas surrounded by the standing wall cavity, and a plurality of the gas inlets is provided corresponding to portions of the rear molding surface in the plurality of closed spaces, and that the apparatus is configured such that the resin material is introduced into the cavity from the resin inlet and, when filling an inside of each of the closed spaces with the relevant resin material, the introduction of the gas is sequentially started, beginning with the gas inlet provided in the closed space which is first filled with the relevant resin material.

In these cases, the resin molded article having the standing wall standing from the rear surface of the plate-like body can be molded with a state of strain such as a shrink effectively prevented from occurring on a whole of the front surface. That is, by the gas inlet being provided in each closed space, it is possible to press the resin material, which has filled the inside of the cavity, against the front molding surface of the cavity. For that reason, it is possible to carry out the pressing of the resin material by the gas before the surface skin grows too much inside the closed space first filled with the resin material, making it possible to effectively prevent a state of strain such as a shrink from occurring.

Also, when carrying out the introduction of the gas, a gas, which has been introduced from a gas inlet into an area between the rear molding surface in a closed space and the resin material which has filled the closed space, can be prevented, by the resin material having filled the inside of the standing wall cavity, from reaching an area between the rear molding surface in adjacent closed spaces and the resin material which has filled the inside of the closed spaces.

Also, in the first aspect of the invention, it is possible that the introduction of the gas through the gas inlets is started after an inside of at least one of the closed spaces is filled with the resin material and before a whole of the cavity is filled with the relevant resin material.

In this case, it becomes easy to press the relevant resin material against the front molding surface of the cavity before the surface skin grows too much inside the cavity.

Also, in the second aspect of the invention, it is preferable that the resin molded article includes a plate-like body and a standing wall standing from a rear surface of the plate-like body, the cavity includes a body cavity for molding the plate-like body and a standing wall cavity for molding the standing wall, the body cavity has formed in a portion thereof a closed space which is an area surrounded by the standing wall cavity, and the gas inlet is provided corresponding to the rear molding surface in the closed space, and that the introduction of the gas is started after the resin material flowing inside the cavity fills the closed space and before a whole of the cavity is filled with the relevant resin material.

In this case too, it becomes easy to press the relevant resin material against the front molding surface of the cavity before the surface skin grows too much inside the cavity.

Also, in the second aspect of the invention, it is also possible that the resin molded article includes a plate-like body and a standing wall standing from a rear surface of the plate-like body, the cavity includes a body cavity for molding the plate-like body and a standing wall cavity for molding the standing wall, the body cavity is formed with a plurality of closed spaces which are areas surrounded by the standing wall cavity, and a plurality of the gas inlets is provided corresponding to portions of the rear molding surface in the plurality of closed spaces, and that the introduction of the gas is started after the resin material flowing inside the cavity fills one of the closed spaces and before the whole of the cavity is filled with the relevant resin material.

In this case too, it becomes easy to press the relevant resin material against the front molding surface of the cavity before the surface skin grows too much inside the cavity.

Also, in the third aspect of the invention, it is preferable that the apparatus is configured such that the introduction of the gas through the gas inlet is started after the resin material fills the inside of the closed space provided with the relevant gas inlet and before the relevant resin material fills the inside of the next closed space.

In this case, the introduction of the gas from the gas inlet can be started each time the inside of each closed space is filled with the resin material. By this configuration, by pressing the resin material, which has filled the inside of the cavity for each closed space, against the front molding surface of the cavity, and carrying out the pressing of the resin material by the gas before the surface skin grows too much, it is possible to effectively prevent a state of strain such as a shrink from occurring on the whole of the front surface of the resin molded article.

Also, in the third aspect of the invention, it is preferable that the apparatus is configured such that the introduction of the gas through the gas inlets is sequentially started, beginning with the gas inlet located in an area having a short passageway length of the resin material from the resin inlet.

In this case, the introduction of the gas can be carried out in accordance with an order in which the resin material passes through each area inside the cavity.

Also, an area or a closed space which is first filled with the resin material can be an area or a closed space having a short resin material passageway length from the resin inlet.

Also, in the first to third aspects of the invention, the introduction of the gas through the gas inlet can be started immediately after the resin material fills the inside of the closed space provided with the relevant gas inlet. In this case, after an inside of a closed space is filled with the resin material, the introduction of the gas can be swiftly started before the surface skin grows too much inside the closed space.

Also, a status of a flow of the resin material inside the cavity can be monitored by a sensor provided in the forming mold. Then, the sensor detects that an inside of a closed space has been filled with the resin material and, when the detection occurs, the introduction of the gas can be started from the gas inlet provided in the closed space.

Also, under prescribed injection molding conditions, when a time at which the resin material fills the inside of each closed space is known, the introduction of the gas from each gas inlet can be started after the introduction of the resin material into the cavity from the resin inlet is started and a prescribed period of time has elapsed.

A fourth aspect of the invention provides a resin molded article manufacturing method for manufacturing a resin molded article including a boss of circular cross-section projected from a rear surface of a plate-like body, using a forming mold formed with a body cavity for molding the plate-like body and a boss cavity for molding the boss; the forming mold including an inner gas nozzle provided inside an inner molding wall of the boss for forming an inner periphery of the boss cavity, and an outer gas nozzle provided in a rear molding surface of the body cavity for molding a rear surface of the plate-like body, the method including:

filling an inside of the body cavity and boss cavity with a resin material, pressing the resin material against a front molding surface of the body cavity for molding a front surface of the plate-like body by injecting a gas from the outer gas nozzle into an area between the rear molding surface and the resin material which has filled the inside of the body cavity; and pressing the resin material against the front molding surface by injecting the gas from the inner gas nozzle into an area between a leading end surface of the inner molding wall and the resin material facing the leading end surface.

In the resin molded article manufacturing method of this aspect of the invention, a forming mold provided with the inner gas nozzle and the outer gas nozzle is used. Then, by devising a timing of ejecting the gas from the inner gas nozzle and the outer gas nozzle, a state of strain such as a shrink is effectively prevented from occurring on a front surface of the resin material.

In manufacturing the resin molded article, first, the inside of the body cavity and boss cavity is filled with the resin material. At this time, a filling of the boss cavity with the resin material can be carried out via the body cavity.

Next, the gas is injected from the outer gas nozzle into the area between the rear molding surface of the body cavity and the resin material which has filled the inside of the body cavity. At this time, the resin material inside the body cavity is pressed against the front molding surface of the body cavity.

Next, the gas is injected from the inner gas nozzle into the area between the leading end surface of the inner molding wall and the resin material facing the leading end surface. At this time, the resin material inside the body cavity is pressed against the front molding surface of the body cavity.

By this configuration, in this aspect of the invention, in a condition in which the resin material positioned in the proximity of an outer periphery of the boss cavity is pressed against the front molding surface of the body cavity, the resin material facing the leading end surface of the inner molding wall (the resin material positioned on an inner peripheral side of the boss cavity) can be pressed against the front molding surface of the body cavity.

Therefore, in the resin molded article molded by the manufacturing method of this aspect of the invention, it is possible to effectively prevent a state of strain such as a shrink (a dimple formed on a surface) from occurring on the front surface corresponding to the whole of the boss formation position.

A fifth aspect of the invention provides a resin molded article manufacturing apparatus for manufacturing a resin molded article including a boss of circular cross-section projected from a rear surface of a plate-like body, the apparatus including:

a forming mold formed with a body cavity for molding the plate-like body and a boss cavity for molding the boss;

an inner gas nozzle provided inside an inner molding wall forming an inner periphery of the boss cavity; and an outer gas nozzle provided in a rear molding surface of the body cavity for molding a rear surface of the plate-like body, wherein the apparatus is configured such that, a gas is injected through the inner gas nozzle into an area between a leading end surface of the inner molding wall and the resin material facing the leading end surface, after a gas is injected through the outer gas nozzle into an area between the rear molding surface and the resin material which has filled the inside of the body cavity.

The resin molded article manufacturing apparatus of this aspect of the invention, including a forming mold provided with the inner gas nozzle and the outer gas nozzle, is configured such that, after the gas is injected through the outer gas nozzle into the area between the rear molding surface of the body cavity and the resin material which has filled the inside of the body cavity, the gas is injected through the inner gas nozzle into the area between the leading end surface of the inner molding wall and the resin material facing the leading end surface.

By this configuration, in this aspect of the invention too, in a condition in which the resin material positioned farther to the outer peripheral side than the boss cavity is pressed against the front molding surface of the body cavity, the resin material facing the leading end surface of the inner molding wall (the resin material positioned on an inner peripheral side of the boss cavity) can be pressed against the front molding surface of the body cavity.

Therefore, in the resin molded article molded by the manufacturing apparatus of this aspect of the invention, it is possible to effectively prevent a state of strain such as the shrink from occurring on the front surface corresponding to the whole of the boss formation position.

The fourth and fifth aspects of the invention relate to a method and apparatus for manufacturing a resin molded article including a boss of circular cross-section projected from a rear surface of a plate-like body.

In the fourth and fifth aspects of the invention, the resin molded article can be a radiator grille, a back garnish, a side molding, a wheel cover, an instrument panel or the like.

Also, the boss can be used as an attachment portion used for attaching the resin molded article to another part. In the case of using the boss as the attachment portion, for example, it is possible that a threaded hole is formed on an inner periphery of the boss, and a screw disposed on the another part is screwed into the threaded hole.

Also, the plate-like body is not necessarily formed as a whole of the resin molded article, as it can also be formed as one portion of the resin molded article. In the case of forming the plate-like body as one portion of the resin molded article, as will be described hereafter, it is preferable that the plate-like body is formed surrounded by a projecting wall projecting from the rear surface thereof.

Also, the gas injected into the forming mold can be a high pressure gas such as air.

A timing of starting the injection of the gas into the forming mold from the inner gas nozzle can be after the gas injected from the outer gas nozzle spreads all over a perimeter of the body cavity on the outer peripheral side. Also, a timing of starting the injection of the gas into the forming mold from the inner gas nozzle can also be after the gas spreads into a whole of the area between the rear molding surface of the body cavity and the resin material which has filled the inside of the body cavity.

Also, in the fourth aspect of the invention, it is preferable that the plate-like body is surrounded by a projecting wall projecting from the rear surface thereof, a projecting wall cavity for molding the projecting wall is formed contiguously with the body cavity, and, when filling the inside of the body cavity with the resin material, an inside of the projecting wall cavity is also filled with the relevant resin material. Also, in the fifth aspect of the invention, it is preferable that the plate-like body is surrounded by a projecting wall projecting from the rear surface thereof, and a projecting wall cavity for molding the projecting wall is formed contiguously with the body cavity.

In these cases, the gas injected from the outer gas nozzle into the area between the rear molding surface of the body cavity and the resin material which has filled the inside of the body cavity can be easily prevented, by the resin material having filled the inside of the projecting wall cavity, from reaching the front molding surface of the body cavity.

Also, in the fourth aspect of the invention, it is preferable that a rib cavity for forming a strengthening rib at a base of the boss is formed at a base of an outer periphery of the boss cavity, and, when filling the inside of the body cavity and boss cavity with the resin material, an inside of the rib cavity is also filled with the relevant resin material. Also, in the fifth aspect of the invention, it is preferable that a rib cavity for molding a strengthening rib at a base of the boss is formed at a base of an outer periphery of the boss cavity.

In these cases, in the resin molded article molded, the base of the boss can be strengthened by the strengthening rib.

DETAILED DESCRIPTION OF THE PREFERRED EMBODIMENTS

First Embodiment

Hereafter, a description will be given, along with the drawings, of a first embodiment related to the injection molding method and the injection molding apparatus of the invention.

Figure 1:
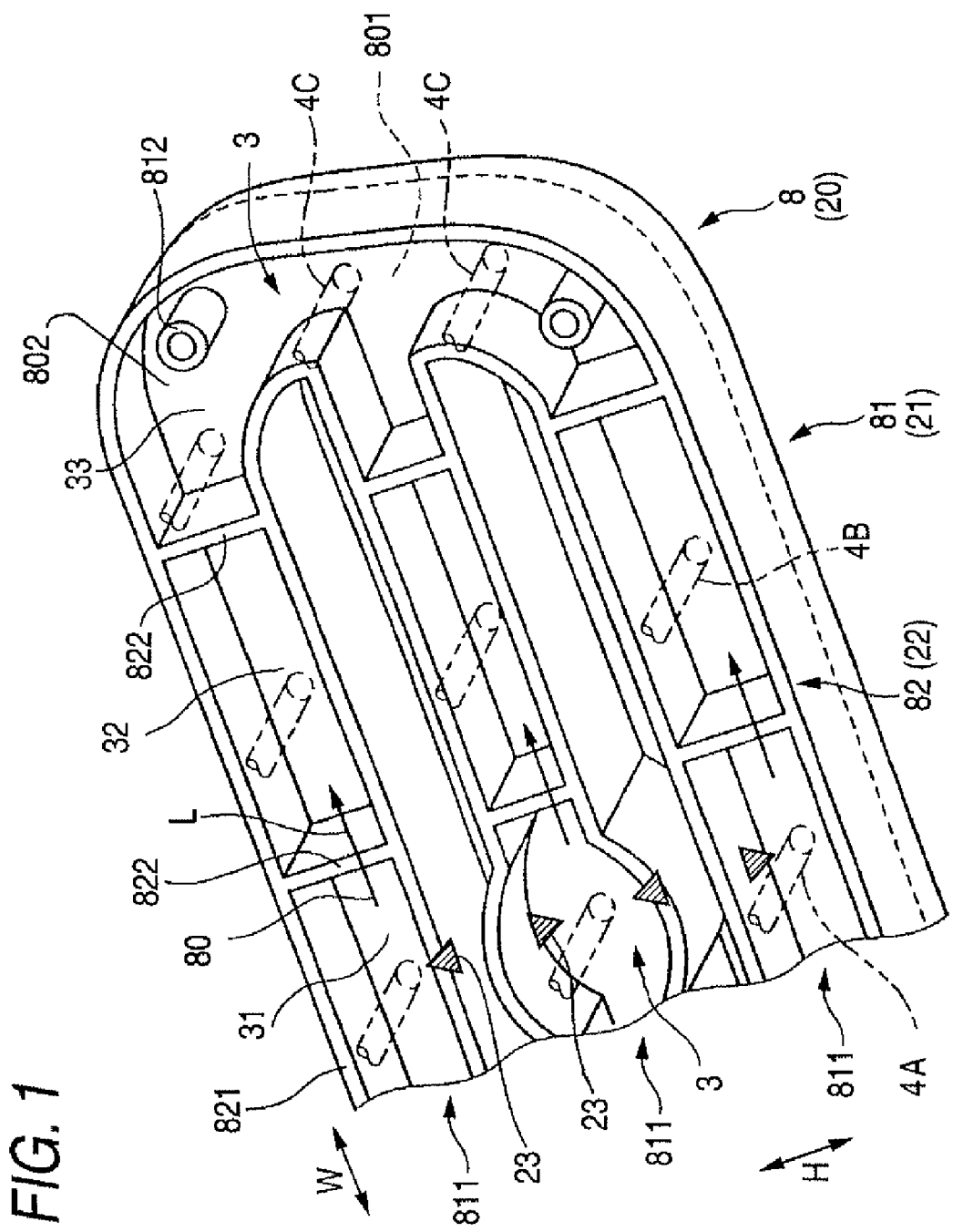
FIG. 1 is a perspective view showing a resin molded article, according to a first embodiment.
Figure 2:
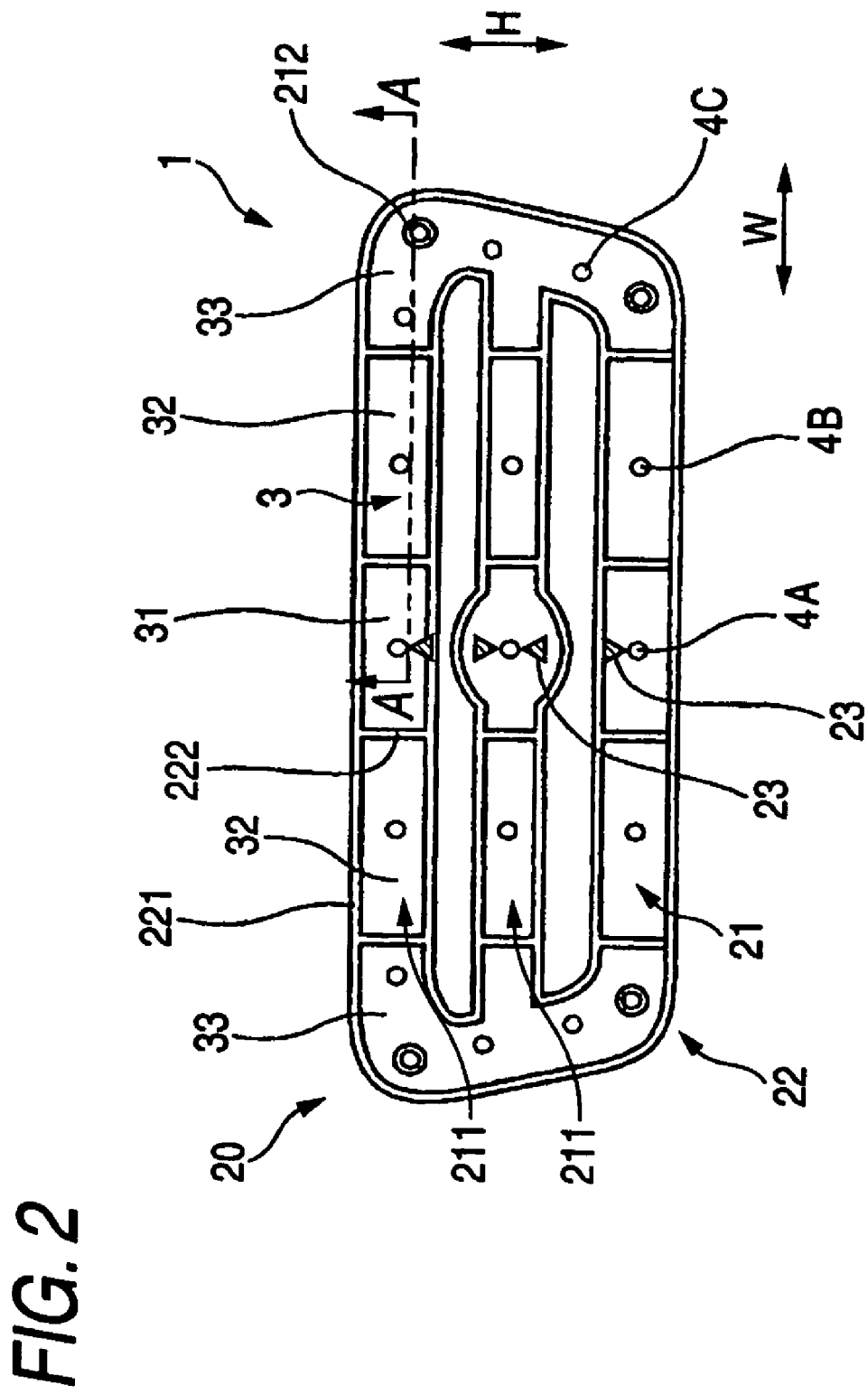
FIG. 2 is a plan view showing a formation of a cavity in a forming mold of an injection molding apparatus, according to the first embodiment.
Figure 3:
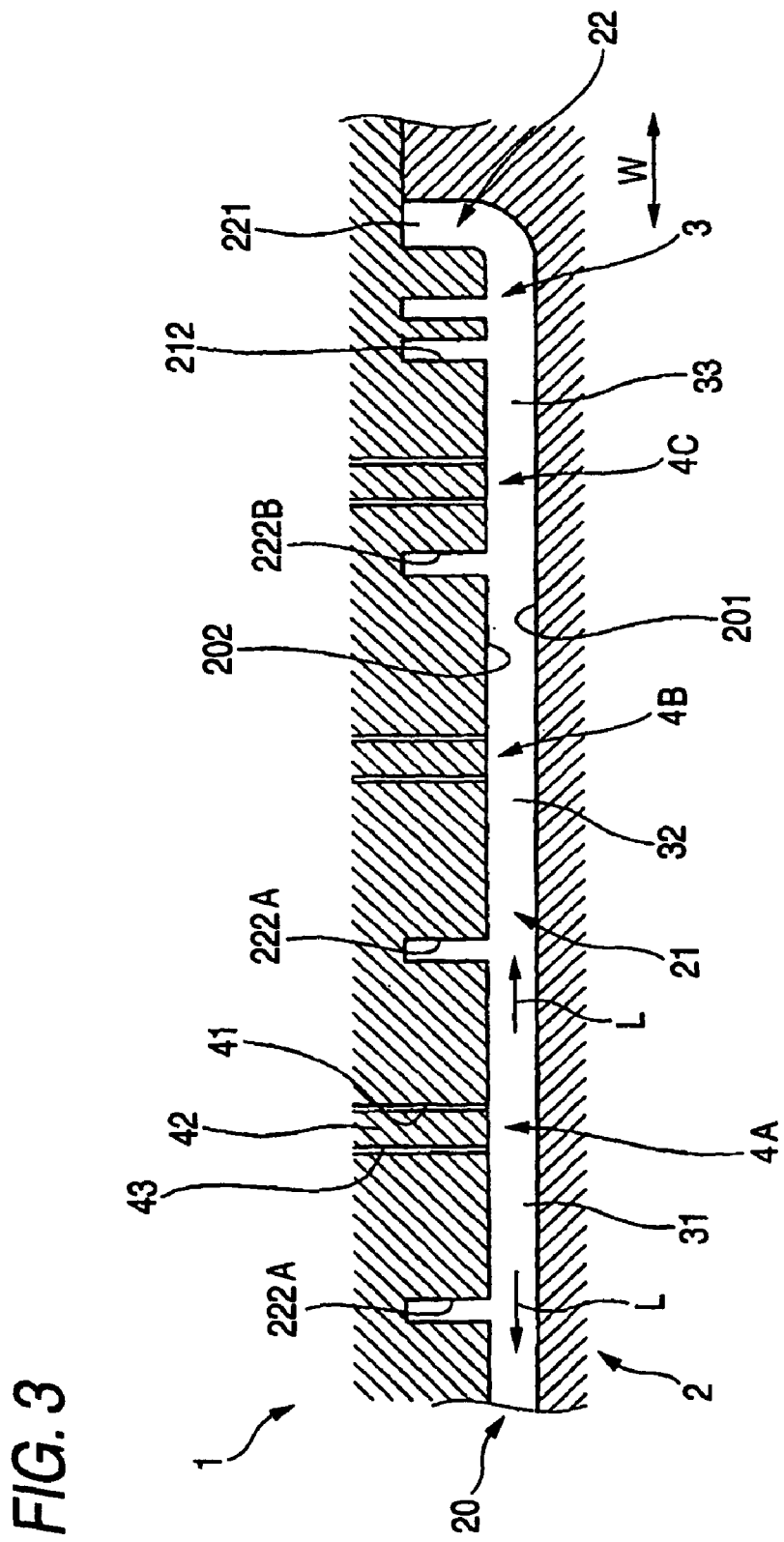
FIG. 3 is a sectional view showing the injection molding apparatus, looking in a direction of arrow A in FIG. 2, according to the first embodiment.

As shown in FIGS. 1 to 3, an injection molding method and an injection molding apparatus 1 of the first embodiment use a forming mold 2 provided with a plurality of gas inlets 4A, 4B, and 4C for introducing a gas G which presses a resin material 80 inside a cavity 20. Then, by devising a timing of ejecting the gas G from the gas inlets 4A, 4B, and 4C, a state of strain such as a shrink, or shrink mark, is effectively prevented from occurring on a front surface 801 of a resin molded article 8.

As shown in FIGS. 2 and 3, the injection molding apparatus 1 of the first embodiment includes a forming mold 2 provided with: a cavity 20 which is filled with a resin material 80 to obtain a resin molded article 8; and a resin inlet 23 through which the resin material 80 is introduced into the cavity 20.

A rear molding surface 202 of the cavity 20 for molding a rear surface 802 of the resin molded article 8, is provided with the gas inlets 4A, 4B, and 4C through which the gas G is introduced into an area between the rear molding surface 202 and the resin material 80 inside the cavity 20. The plurality of the gas inlets 4A, 4B, and 4C is provided along a passage direction L of the resin material 80 in the cavity 20.

In molding the resin molded article 8 using the injection molding apparatus 1, as shown in FIGS. 4 to 9, a molten resin material 80 is introduced into the cavity 20 from the resin inlet 23. Then, when filling the inside of the cavity 20 with the resin material 80, a gas inlet 4A positioned close to the resin inlet 23 starts the introduction of the gas G earlier than a gas inlet 4B, 4C positioned far from the resin inlet 23. In the first embodiment, the introduction of the gas G is sequentially started, beginning with a gas inlet 4A provided in an area inside the cavity 20 which is first filled with the resin material 80. By this configuration, the resin material 80 is sequentially pressed against a front molding surface 201 inside the cavity 20 for molding the front surface 801 of the resin molded article 8, beginning with the area inside the cavity 20 which is first filled with the resin material 80.

Hereafter, a detailed description will be given, along with FIGS. 1 to 9, of the injection molding method and injection molding apparatus 1 of the first embodiment.

As shown in FIG. 1, the resin molded article 8 molded in the first embodiment includes a plate-like body 81 and a standing wall 82 standing from the rear surface 802 of the plate-like body 81. Also, a boss 812 for use in attaching the resin molded article 8 to another part or the like is formed projecting from the rear surface 802 of the plate-like body 81. The boss 812 has a circular shape in cross-section. Then, a threaded hole into which is screwed a screw disposed on another part can be formed in an inner periphery of the boss 812 in an injection-molded resin molded article 8.

The standing wall 82 in the first embodiment includes an outer peripheral standing wall 821 standing from an edge of the rear surface 802 of the plate-like body 81 and a partition standing wall 822 standing from the rear surface 802 of the plate-like body 81. The resin molded article 8 of the first embodiment is a radiator grille. The partition standing wall 822 of the first embodiment, being a strengthening rib for strengthening the resin molded article 8, is formed perpendicularly to a lengthwise direction (a right-left direction) W of the radiator grille.

As shown in FIG. 1, the plate-like body 81 of the first embodiment includes a plurality of body components 811, which is elongated in the right-left direction W, formed in parallel and connected at right and left ends of the plate-like body 81. The outer peripheral standing wall 821 of the first embodiment is formed on each side of the body components 811 in an up-down direction H, and the partition standing walls 822 are formed, standing from the rear surface 802 of each body component 811, in a plurality of portions thereof in the right-left direction W.

As shown in FIGS. 2 and 3, the cavity 20 of the first embodiment includes a body cavity 21 for molding the plate-like body 81, a standing wall cavity 22 for molding the standing wall 82, and a boss cavity 212 for molding the boss 812. Also, the body cavity 21 includes formed therein a plurality of closed spaces 3 which are areas surrounded by the standing wall cavity 22.

The body cavity 21 of the first embodiment includes a plurality of cavity components 211 which mold the body components 811. Also, the standing wall cavity 22 includes an outer peripheral standing wall cavity 221 for molding the outer peripheral standing wall 821 and partition standing wall cavities 222 for molding the partition standing walls 822.

As shown in FIGS. 2 and 3, the closed space 3 of the first embodiment is formed as an area surrounded by the outer peripheral standing wall cavity 221 and the partition standing wall cavities 222. A plurality of the closed spaces 3 is formed in the right-left direction W of the cavity 20. The closed spaces 3 of the first embodiment include a central closed space 31 positioned in a center of the body cavity 21, a distal closed space 33 positioned at each end of the body cavity 21 in the right-left direction W, and an intermediate closed space 32 formed between the central closed space 31 and the distal closed space 33.

Also, a plurality of the central closed spaces 31 and the intermediate closed spaces 32 is formed on the right and left sides of the body cavity 21 in such a way as to correspond to the plurality of cavity components 211.

Also, a plurality of the boss cavities 212 of the first embodiment is formed in each distal closed space 33.

Also, a passageway length of the resin material 80 from the resin inlets 23 increases in an order of the central closed space 31, the intermediate closed spaces 32 and the distal closed space 33.

Also, as shown in FIGS. 2 and 3, the resin inlet 23 of the first embodiment is provided in a central portion of the cavity 20, and the cavity 20 of the first embodiment is filled with the resin material 80, which has been introduced from the resin inlet 23, caused to diverge in the right-left direction W. Also, the resin inlet 23 of the first embodiment is provided in each of the plurality of cavity components 211, and flows of the resin material 80 introduced into the individual cavity components 211 from the corresponding resin inlets 23 converge at ends of the cavity 20 in the right-left direction W.

The gas inlets 4A, 4B, and 4C are provided in portions of the rear molding surface 202 in the corresponding closed spaces 3. In the first embodiment, one gas inlet 4A, 4B is formed in each of the central closed spaces 31 and the intermediate closed spaces 32, and a plurality of the gas inlets 4C is formed in each distal closed space 33.

Each gas inlet 4A, 4B, and 4C includes a gap 43, through which the gas G is caused to pass, formed between a gas passage hole 41 formed in the rear molding surface 202 of the cavity 20 and a cylindrical body 42 disposed inside the gas passage hole 41.

The injection molding apparatus 1 of the first embodiment being for injection molding the resin molded article 8, an injection pressure of the resin material 80 injected into the forming mold 2 is set at, for example, 30 to 50 MPa, and a heating temperature of the resin material 80 injected into the forming mold 2 is set at, for example, 200 to 250° C. Also, the gas G introduced into the cavity 20 from each gas inlet 4A, 4B, and 4C is a high pressure gas of 5 to 15 MPa.

Although not shown, each gas inlet 4A, 4B, and 4C is configured such that the gas G is ejected from it and the ejection is interrupted by means of a valve which opens and closes a flow channel of the gas G. Also, a timing of the gas G ejection from each gas inlet 4A, 4B, and 4C can be controlled by control means such as a sequencer (a programmable controller).

Then, the control means in the injection molding apparatus 1 is configured such that, when sequentially filling the inside of the closed spaces 3 with the resin material 80 introduced into the cavity 20 from the resin inlets 23, the introduction of the gas G is sequentially started, beginning with a gas inlet 4A formed in a closed space 3 first filled with the relevant resin material 80. More specifically, the control means of the first embodiment is configured such that the gas G is introduced from gas inlets 4A, 4B, and 4C each time the closed spaces 3 are filled with the resin material 80, in order, starting with the closed spaces 3 located close to the resin inlets 23, that is, the central closed spaces 31, the intermediate closed spaces 32 and the distal closed spaces 33 are filled with the resin material 80, in the order named.

Next, a detailed description will further be given of a method for molding the resin molded article 8 using the injection molding apparatus 1.

Figure 4:
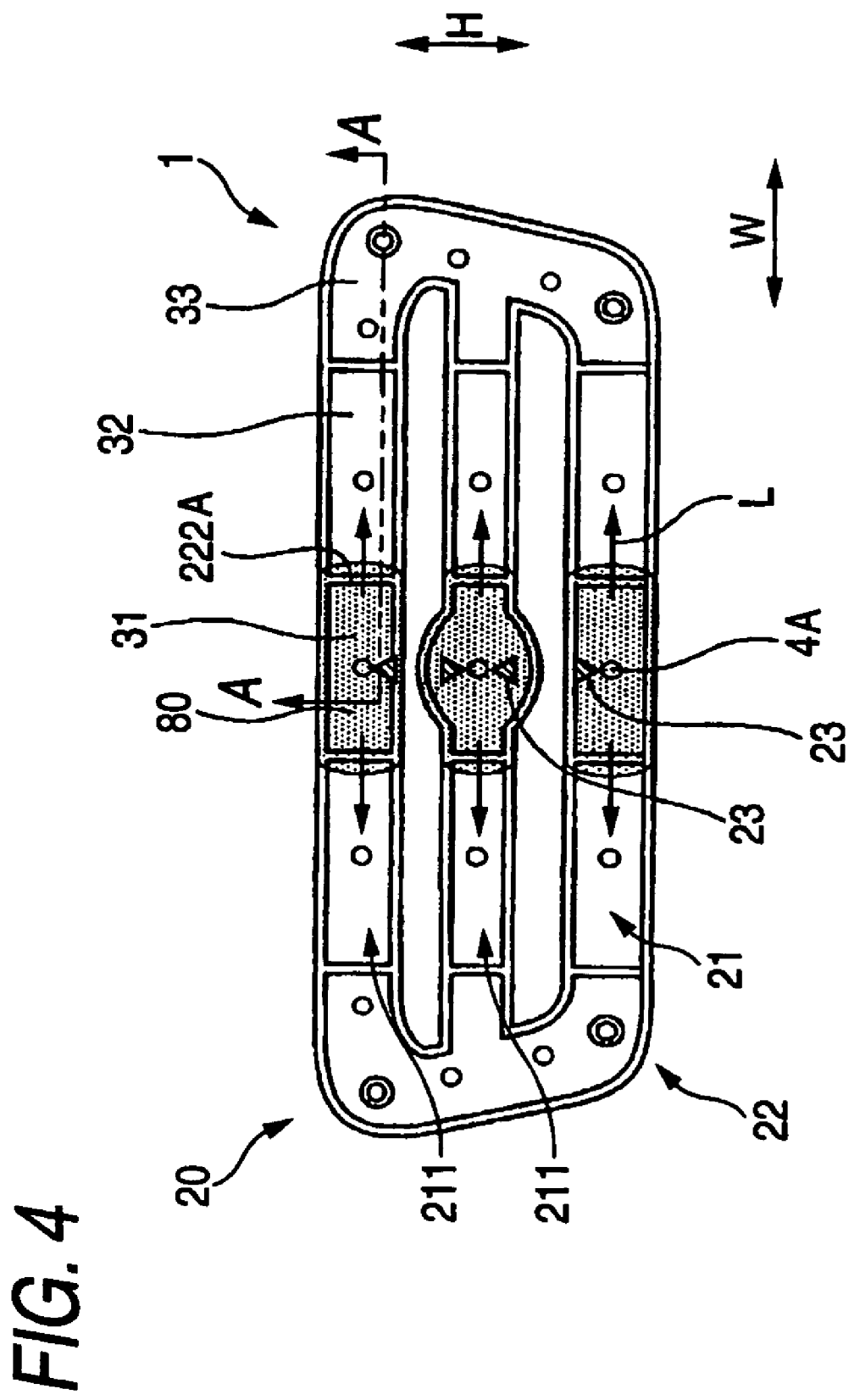
FIG. 4 is a plan view showing the cavity in a condition in which an inside of central closed spaces is filled with a resin material, and a gas is introduced from gas inlets provided in the central closed spaces, according to the first embodiment.
Figure 5:
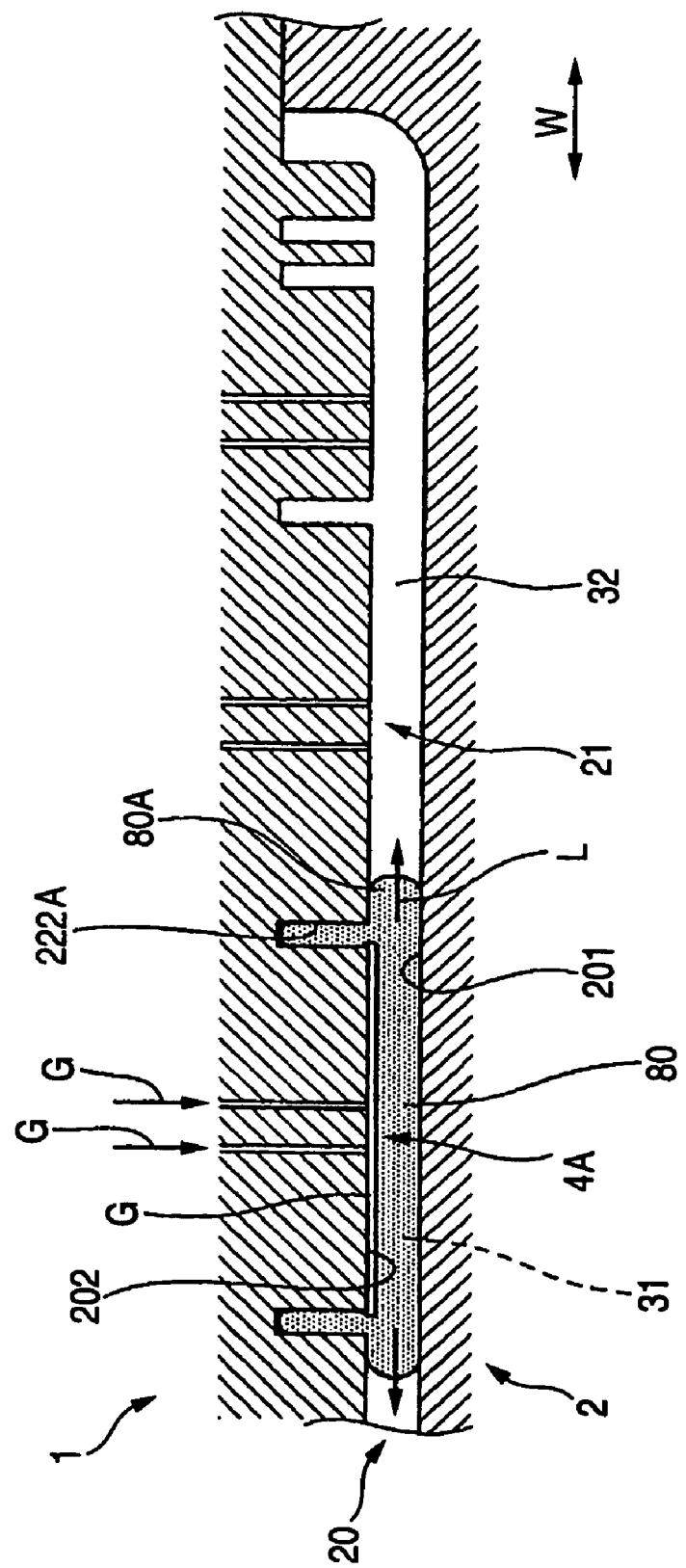
FIG. 5 is a sectional view showing the injection molding apparatus, looking in a direction of arrow A in FIG. 4, according to the first embodiment.

On injection molding the resin molded article 8, as shown in FIGS. 4 and 5, the molten resin material 80 is introduced into each cavity component 211 of the cavity 20 from the plurality of resin inlets 23. At this time, the resin material 80 flows from each resin inlet 23 toward the right and left of each cavity component 211.

Then, as shown in the same figures, when the inside of the central closed space 31, and the inside of the standing wall cavity 22 positioned around the central closed space 31, in each cavity component 211, are filled with the resin material 80, that is, when a flow leading end 80A of the resin material 80 fills up to the inside of first partition standing wall cavities 222A, the control means starts the introduction of the gas G from a gas inlet 4A provided in the central closed space 31.

At this time, while the resin material 80 is flowing inside the cavity 20, the gas G is injected into an area between the rear molding surface 202 in the central closed space 31 and the resin material 80 inside the central closed space 31, and the resin material 80 is pressed against the front molding surface 201 in the central closed space 31.

Also, the gas G introduced from the gas inlet 4A provided in the central closed space 31 is prevented, by the resin material 80 having filled the inside of the first standing wall cavities 222A, from reaching the inside of the intermediate closed spaces 32 adjacent to the central closed space 31.

Figure 6:
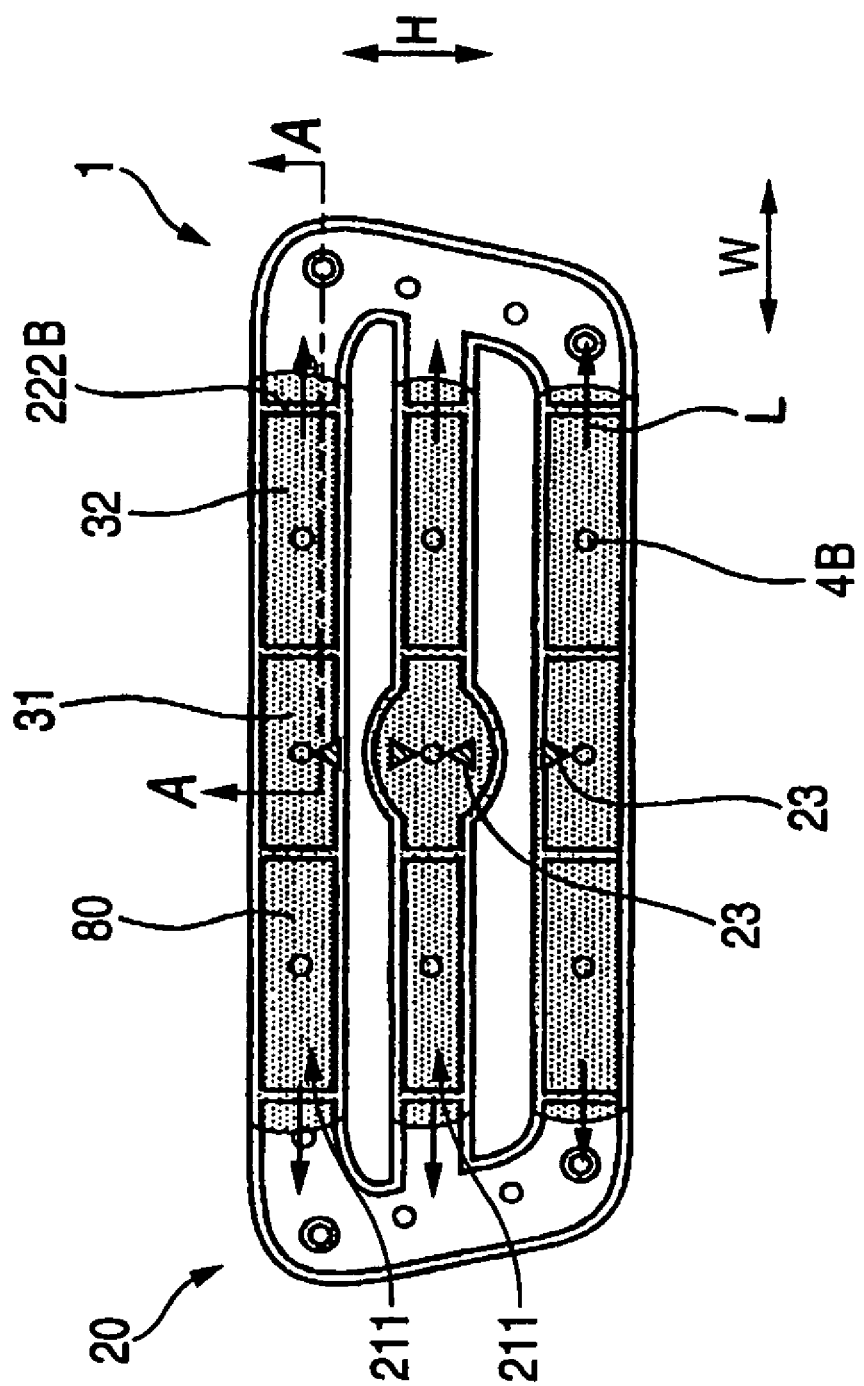
FIG. 6 is a plan view showing the cavity in a condition in which an inside of intermediate closed spaces is filled with the resin material, and the gas is introduced from gas inlets provided in the intermediate closed spaces, according to the first embodiment.
Figure 7:
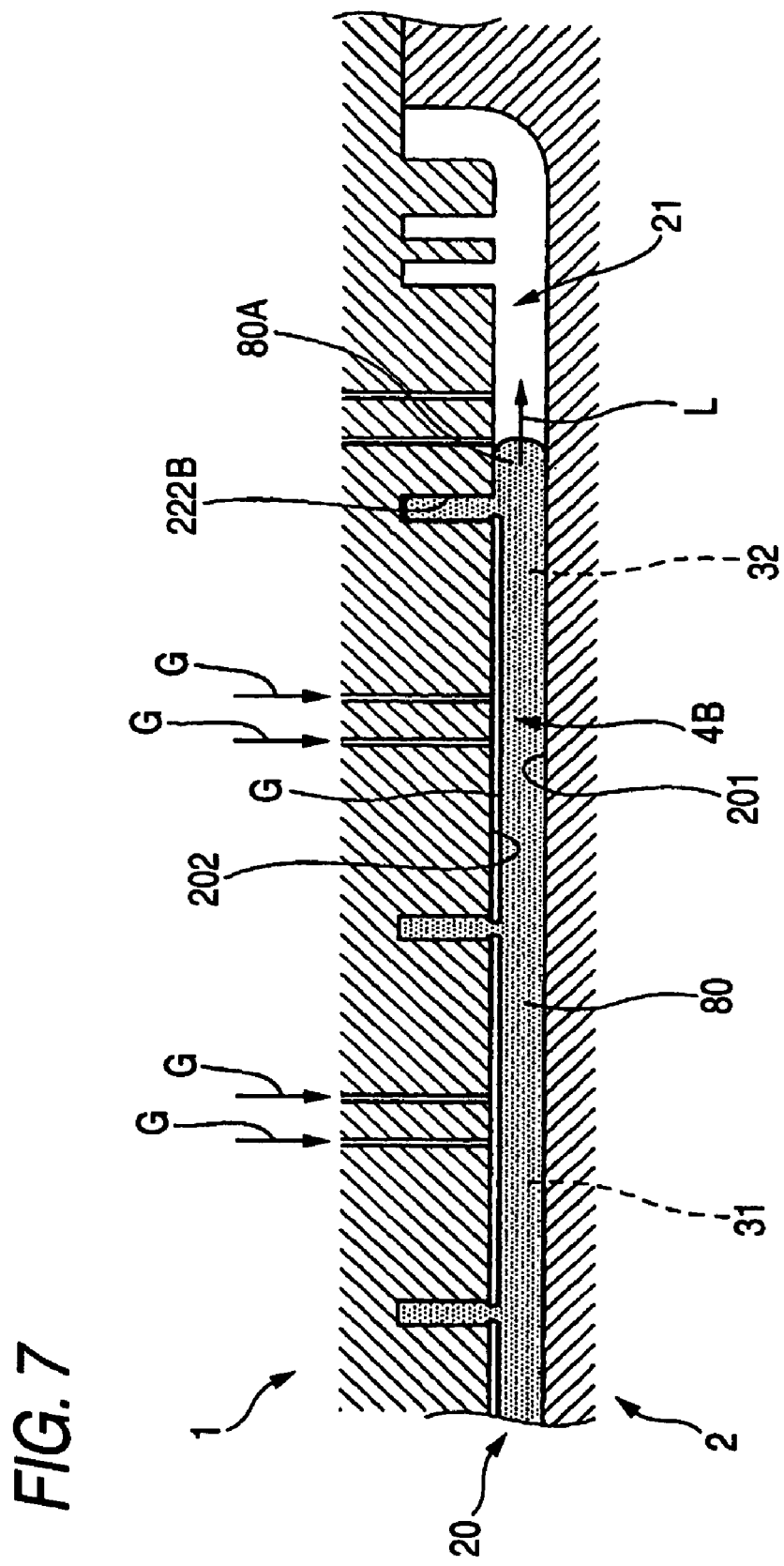
FIG. 7 is a sectional view showing the injection molding apparatus, looking in a direction of arrow A in FIG. 6, according to the first embodiment.

To continue, as shown in FIGS. 6 and 7, when the inside of the intermediate closed spaces 32, and the inside of the standing wall cavity 22 positioned around the intermediate closed spaces 32, in each cavity component 211, are filled with the resin material 80, that is, when the flow leading end of the resin material 80 fills up to the inside of second partition standing wall cavities 222B, the control means starts the introduction of the gas G from gas inlets 4B provided in the intermediate closed spaces 32.

At this time, while the resin material 80 is flowing inside the cavity 20, the gas G is injected into areas between the rear molding surface 202 in the intermediate closed space 32 and the resin material 80 inside the intermediate closed space 32, and this resin material 80 is pressed against the front molding surface 201 in the intermediate closed spaces 32.

Also, the gas G introduced from the gas inlets 4B provided in the intermediate closed spaces 32 is prevented, by the resin material 80 having filled the inside of the second standing wall cavities 222B, from reaching the inside of the distal closed spaces 33 adjacent to the intermediate closed spaces 32.

Figure 8:
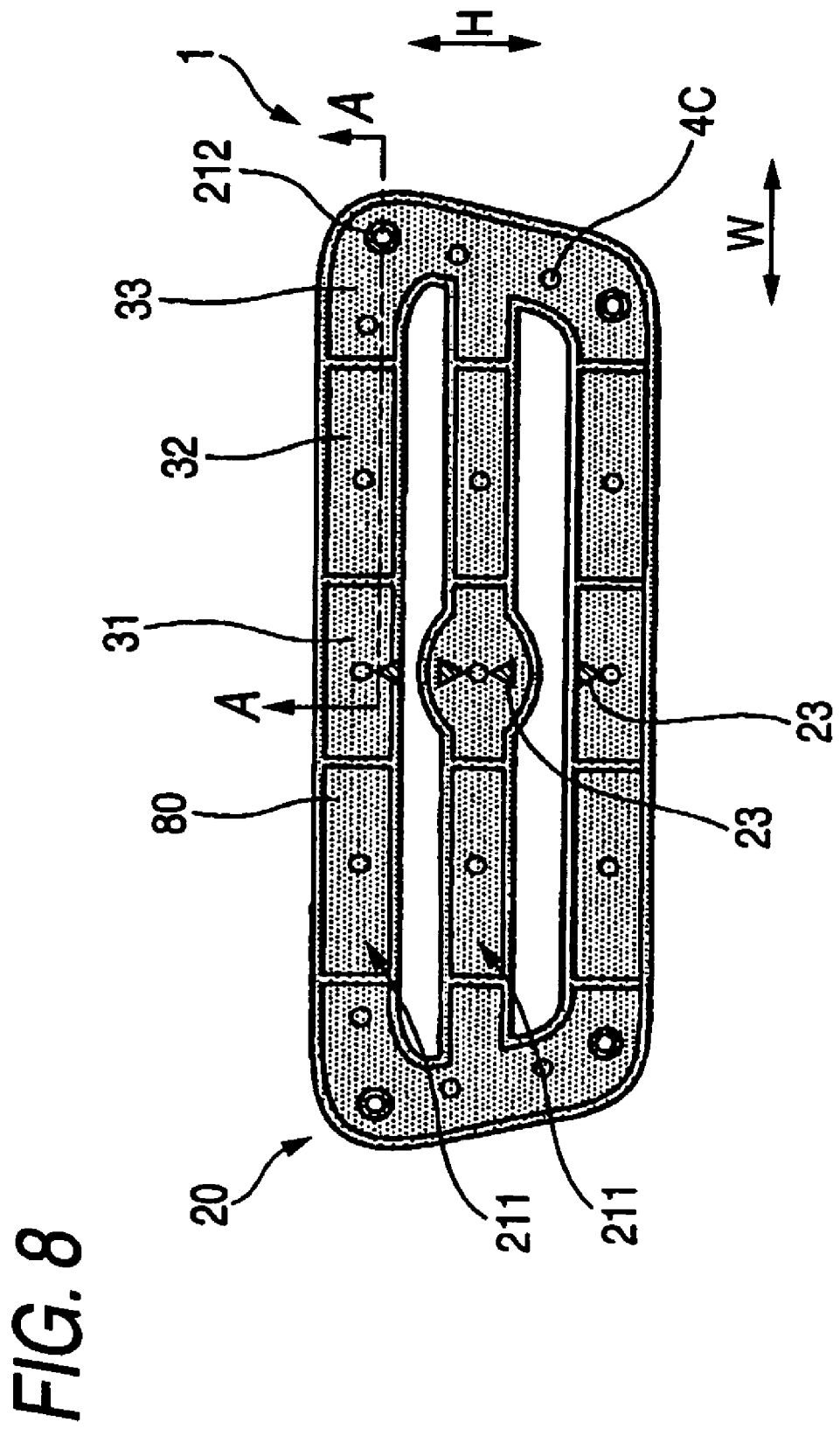
FIG. 8 is a plan view showing the cavity in a condition in which an inside of distal closed spaces is filled with the resin material, and the gas is introduced from gas inlets provided in the distal closed spaces, according to the first embodiment.
Figure 9:
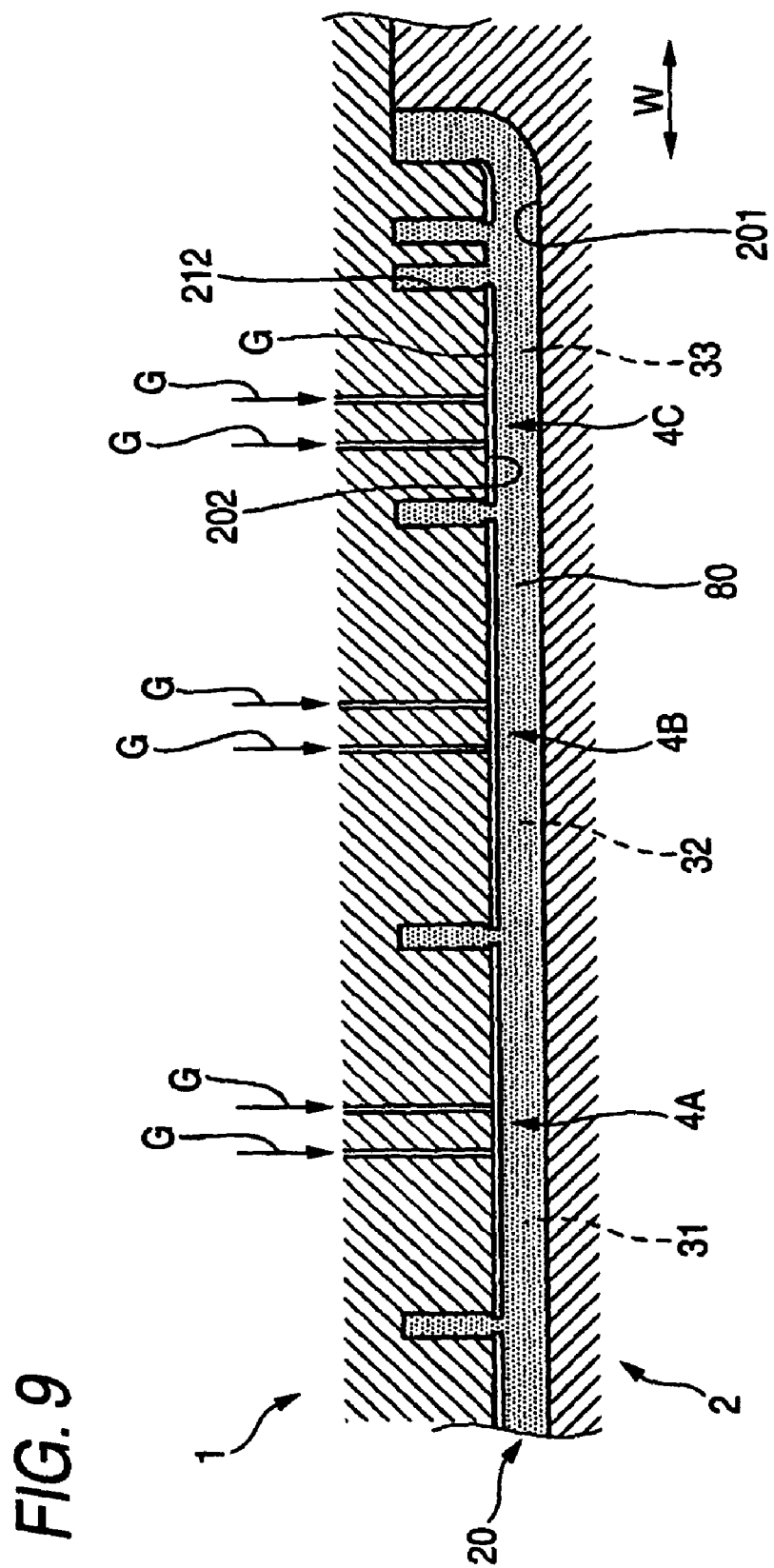
FIG. 9 is a sectional view showing the injection molding apparatus, looking in a direction of arrow A in FIG. 8, according to the first embodiment.

To continue, as shown in FIGS. 8 and 9, when the inside of the distal closed spaces 33, the inside of the standing wall cavity 22 positioned around the distal closed spaces 33, and the inside of the boss cavities 212, are filled with the resin material 80, that is, when the resin material 80 fills a whole of the cavity 20, the control means starts the introduction of the gas G from gas inlets 4C provided in the distal closed spaces 33.

At this time, the gas G is injected into areas between the rear molding surface 202 in the distal closed space 33 and the resin material 80 inside the distal closed space 33, and this resin material 80 is pressed against the front molding surface 201 in the distal closed spaces 33.

When introducing the gas G into the intermediate closed spaces 32, the introduction of the gas G into the central closed spaces 31 is maintained and, when introducing the gas G into the distal closed spaces 33, the introduction of the gas G into the central closed spaces 31 and the intermediate closed spaces 32 is maintained. Then, after the whole of the cavity 20 is filled with the resin material 80, a condition in which the resin material 80 in all the closed spaces 3 is pressed against the front molding surface 201 by the gas G injected from all the gas inlets 4A, 4B and 4C is maintained for a prescribed period of time, and the resin material 80 is cooled and cured, thereby forming the resin molded article 8.

In this way, in the first embodiment, when filling the inside of the cavity 20 with the resin material 80, inside the cavity 20, the gas inlets 4A and 4B, provided in the closed spaces 3 first filled with the resin material 80, first start the introduction of the gas G into the area between the rear molding surface 202 of the cavity 20 and the resin material 80 inside the cavity 20. By this configuration, the resin material 80 is pressed against the front molding surface 201 of the cavity 20, in order, starting with closed spaces 3 inside the cavity 20 which are first filled with the resin material 80.

For that reason, in the first embodiment, a surface skin (a cured portion of the resin material 80), which is formed on a surface of a molten resin which makes contact with molding surfaces (the front molding surface 201 and the rear molding surface 202) of the cavity 20, grows first in the closed spaces 3 which are first filled with the resin material 80 inside the cavity 20. At the same time, the heretofore described pressing can be sequentially carried out, starting with the resin material 80 which has filled the closed spaces 3, on which the surface skin grows first.

Then, inside the closed spaces 3 first filled with the resin material 80, it is possible to carry out the heretofore described pressing of the resin material 80 by the gas G before the surface skin grows too much, making it possible to effectively prevent a state of strain such as a shrink from occurring.

Also, when the partition standing walls (the strengthening ribs) 822 are formed on the rear surface 802 of the resin molded article 8, a state of strain such as a shrink easily occurs on the front surface 801 corresponding to partition standing wall 822 formation positions. In response, as described heretofore, by sequentially pressing the resin material 80 inside each closed space 3 against the front molding surface 201 before the surface skin on the resin material 80 which has filled the inside of the cavity 20, it is possible to effectively prevent a state of strain such as a shrink from occurring on the front surface 801 corresponding to the partition standing wall 822 formation positions.

Therefore, according to the first embodiment, it is possible to effectively prevent a state of strain such as a shrink (a dimple formed on a surface) from occurring on a whole of the front surface 801 of the resin molded article 8. Also, the heretofore described injection method and injection molding apparatus 1 are suitable particularly in carrying out an injection molding of a large-size or long resin molded article 8.

The heretofore described injection molding method and injection molding apparatus 1 can be applied not only to the radiator grille, but to various resin molded articles obtained by carrying out a resin injection molding. Then, also when carrying out the injection molding of various resin molded articles, by previously providing a plurality of the gas inlets 4A, 4B, and 4C along the passage direction L of the resin material 80 in the cavity 20, it is possible to obtain the same working effect as the heretofore described one by carrying out the same operation as the heretofore described one.

Second Embodiment

Hereafter, a description will be given, along with the drawings, of a second embodiment related to a resin molded article manufacturing method and apparatus according to the invention.

Figure 10:
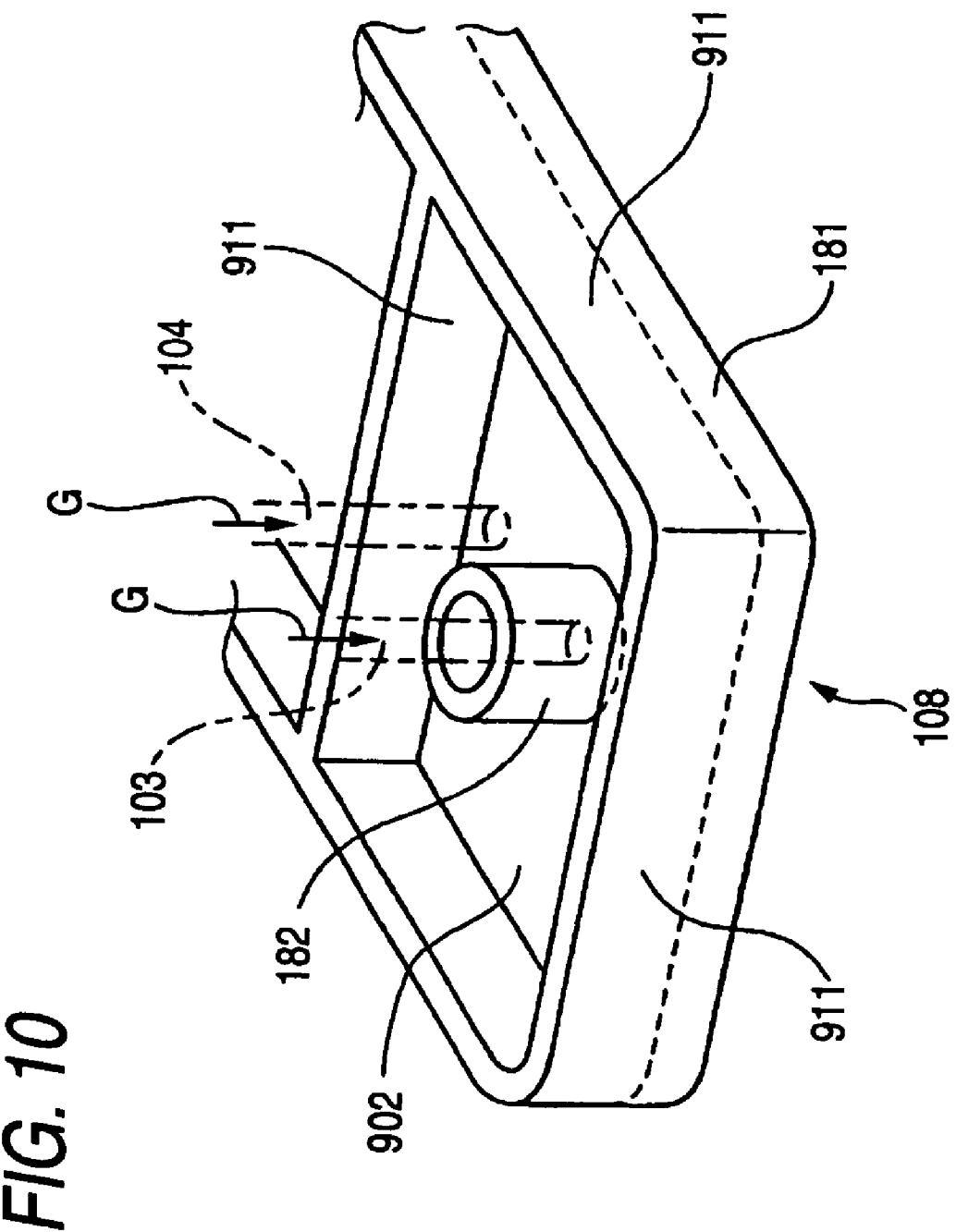
FIG. 10 is a perspective view showing a resin molded article, according to a second embodiment.

In a resin molded article 8 manufacturing method and apparatus 101 of the second embodiment, as shown in FIG. 10, the resin molded article 108, including a boss 182 of circular cross-section projected from a rear surface 902 of a plate-like body 181, is manufactured.

Figure 11:
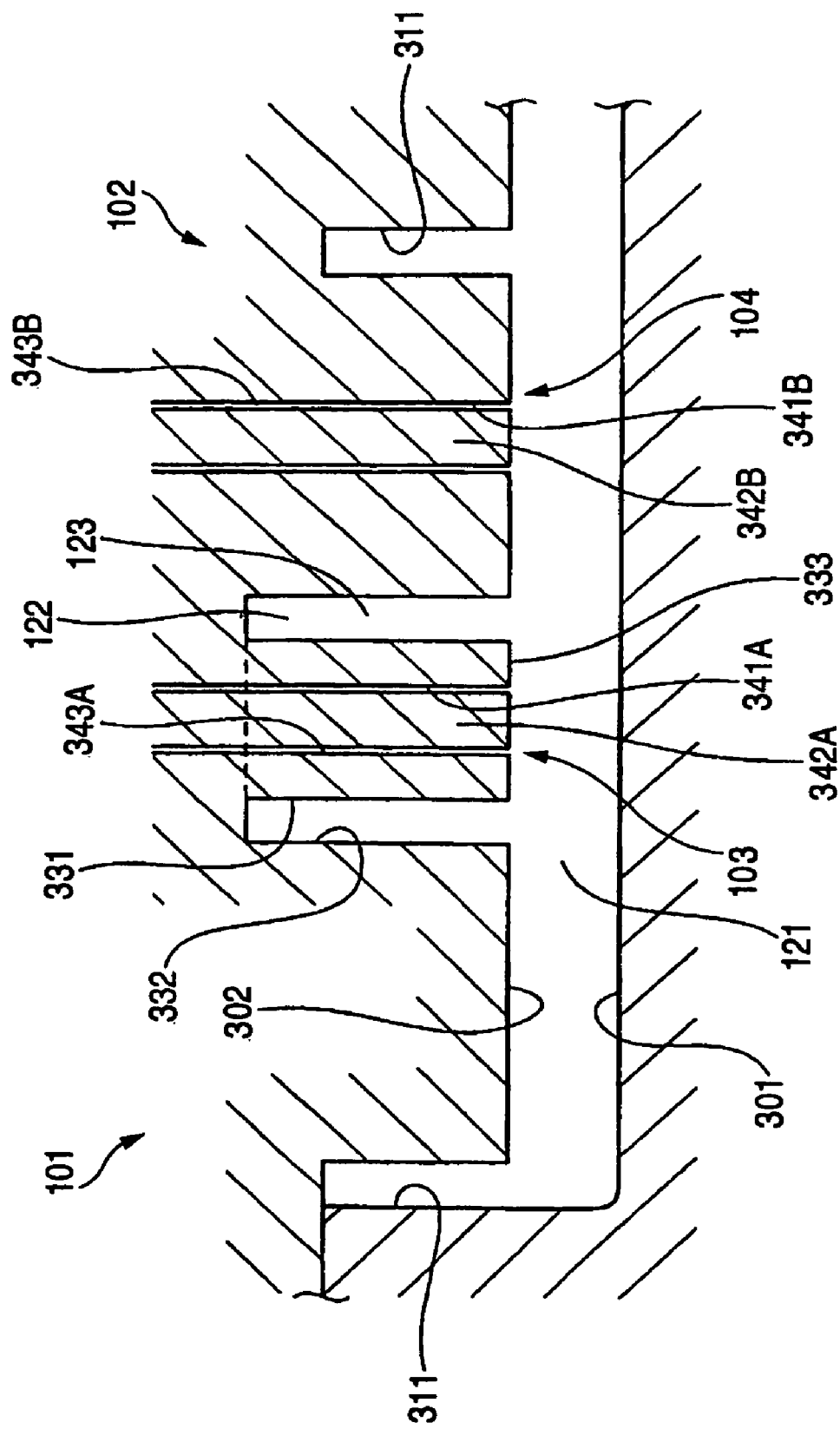
FIG. 11 is a sectional view showing a resin molded article manufacturing apparatus, according to the second embodiment.

As shown in FIG. 11, the manufacturing apparatus 101 includes a forming mold 102 having formed therein a body cavity 121 for molding the plate-like body 181 and a boss cavity 122 for molding the boss 182. In the forming mold 102, an inner gas nozzle 103 is provided inside an inner molding wall 123 forming an inner periphery 331 of the boss cavity 122, and an outer gas nozzle 104 is provided in a rear molding surface 302 of the body cavity 121 for molding the rear surface 902 of the plate-like body 181.

Figure 12:
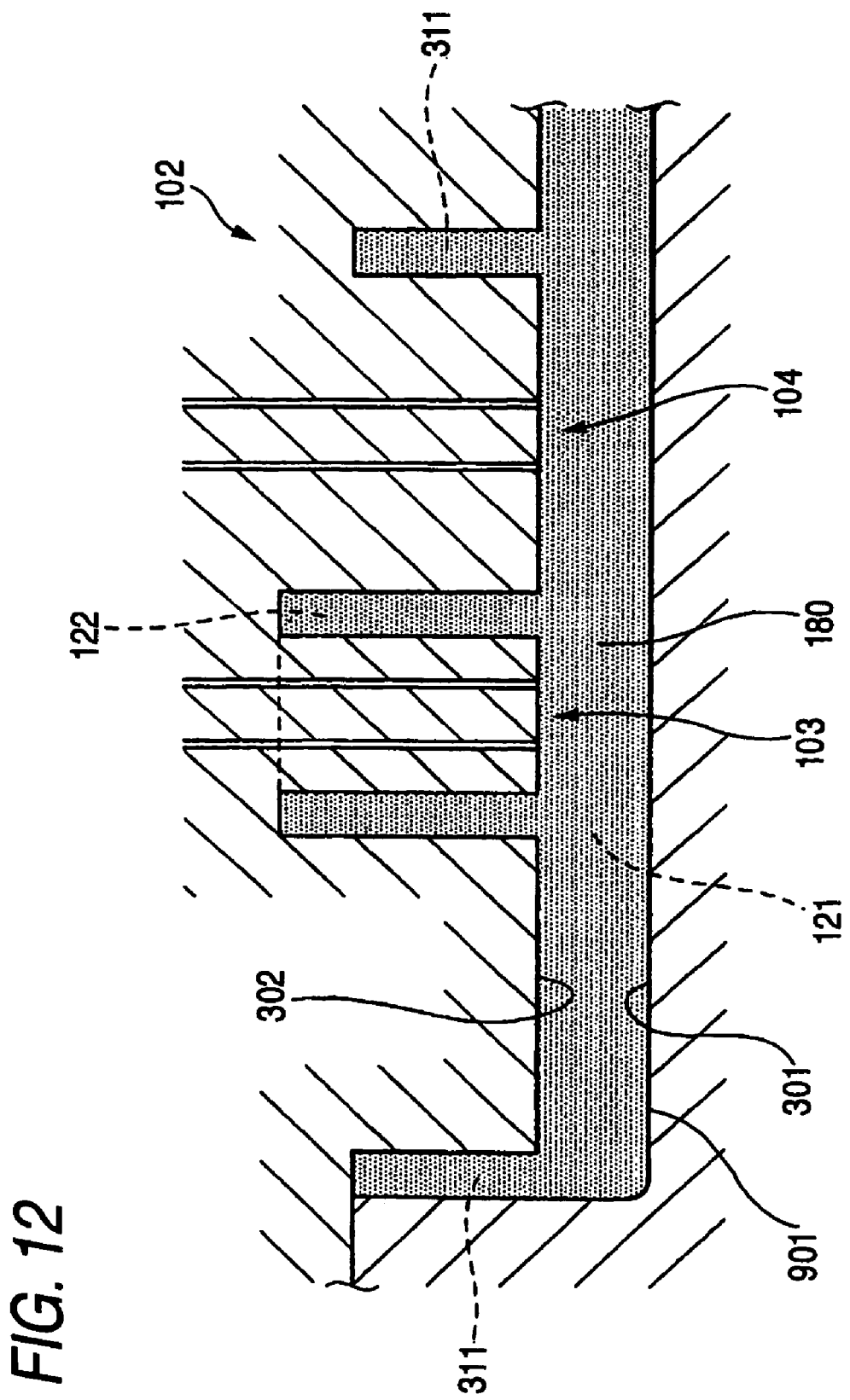
FIG. 12 is a sectional view showing the resin molded article manufacturing apparatus in a condition in which an inside of a forming mold is filled with a resin material, according to the second embodiment.

Then, in molding the resin molded article 108 using the manufacturing apparatus 101, first, as shown in FIG. 12, an inside of the body cavity 121 and boss cavity 122 is filled with a resin material 180.

Figure 13:
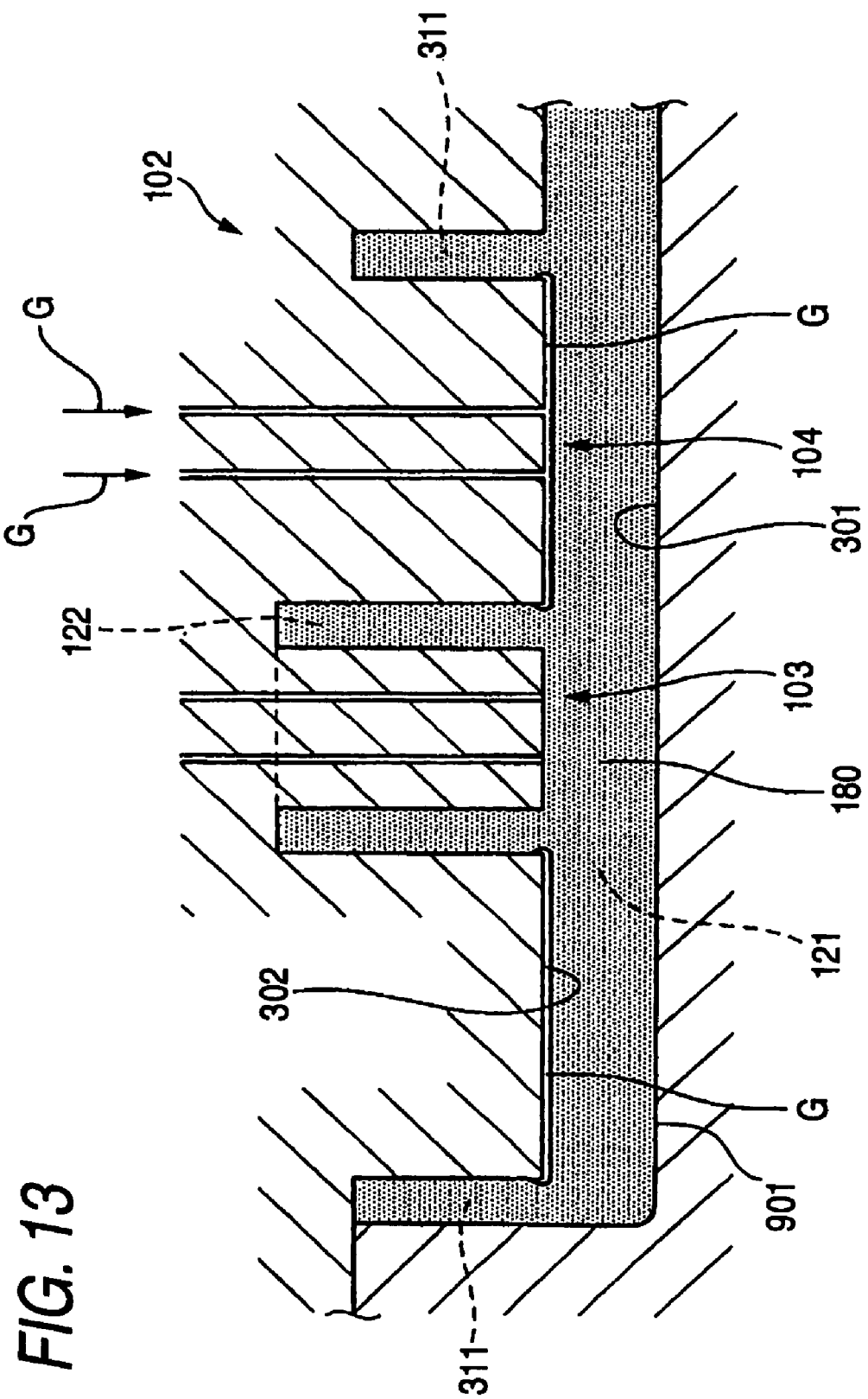
FIG. 13 is a sectional view showing the resin molded article manufacturing apparatus in a condition in which a gas is injected into the forming mold from an outer gas nozzle, according to the second embodiment.
Figure 14:
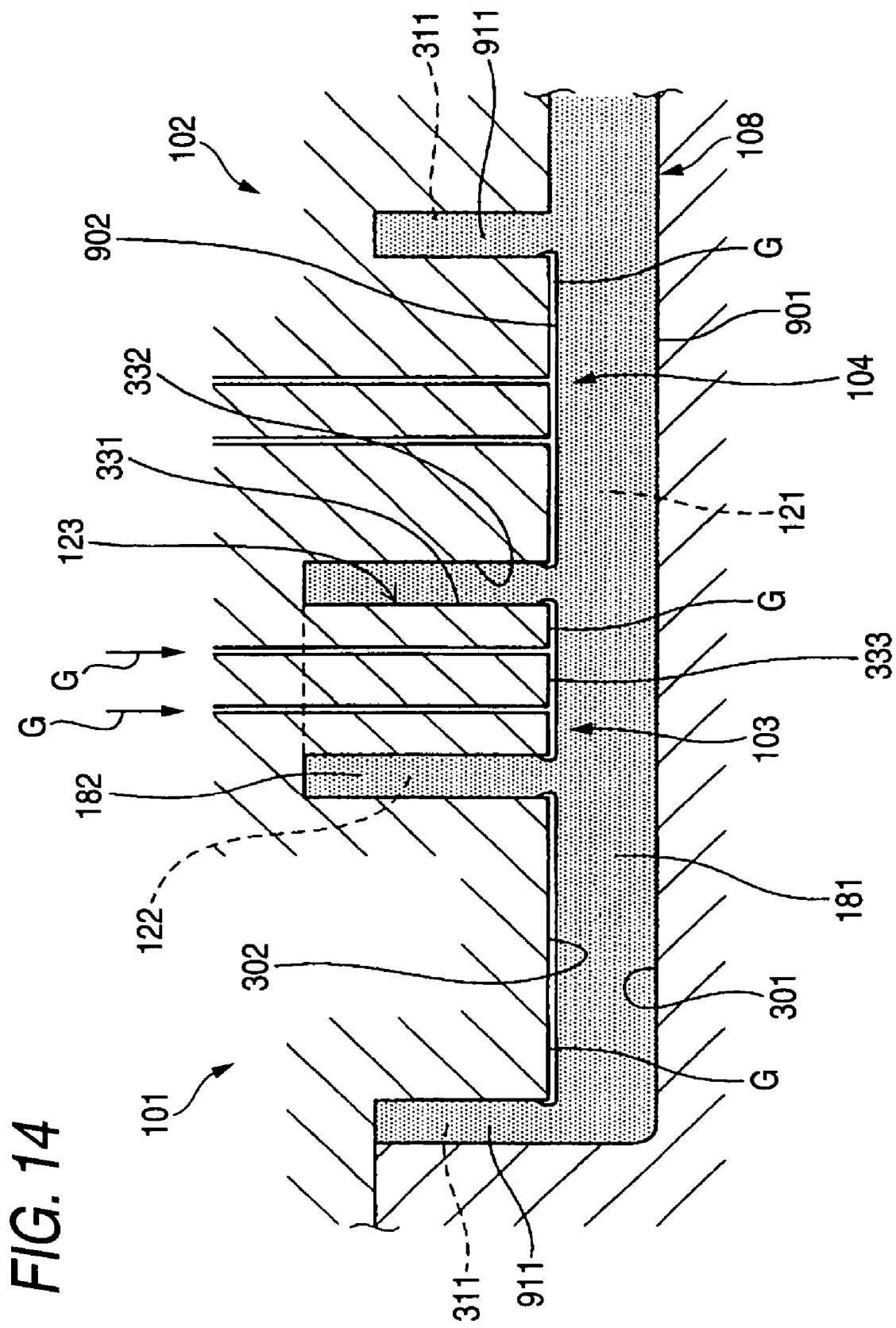
FIG. 14 is a sectional view showing the resin molded article manufacturing apparatus in a condition in which the gas is injected into the forming mold from an inner gas nozzle, according to the second embodiment.

Next, as shown in FIG. 13, by injecting a gas G from the outer gas nozzle 104 into an area between the rear molding surface 302 of the body cavity 121 and the resin material 180 which has filled the inside of the body cavity 121, this resin material 180 is pressed against a front molding surface 301 of the body cavity 121 for molding a front surface 901 of the plate-like body 181. Next, as shown in FIG. 14, by injecting the gas G from the inner gas nozzle 103 into an area between a leading end surface 333 of the inner molding surface 123 and the resin material 180 facing the leading end surface 333, this resin material 180 is pressed against the front molding surface 301 of the body cavity 121.

Hereafter, a detailed description will be given, along with FIGS. 10 to 15, of the resin molded article 108 manufacturing method and apparatus 101.

In the resin molded article 108 manufacturing method of the second embodiment, by devising a timing of ejecting the gas G from the inner gas nozzle 103 and the outer gas nozzle 104, a state of strain such as a shrink (a dimple formed on a surface) is effectively prevented from occurring on the front surface 901 of the resin molded article 108.

The manufacturing apparatus 101 is for carrying out an injection molding of the resin molded article 108. An injection pressure of the resin material 180 injected into the forming mold 102 is set at, for example, 30 to 50 MPa, and a heating temperature of the resin material 180 injected into the forming mold 102 is set at, for example, 200 to 250° C. Also, the gas G injected from the inner gas nozzle 103 and the outer pas nozzle 104 is a high pressure gas of 5 to 15 MPa.

Although not shown, the inner gas nozzle 103 and the outer gas nozzle 104 are configured in such a way as to carry out an ejection of the gas G and an interruption of the ejection by means of a valve which opens and closes a flow channel of the gas G. Also, a timing of ejecting the gas G from the inner gas nozzle 103 and the outer gas nozzle 104 can be controlled by control means such as a sequencer (a programmable controller).

Then, the control means in the manufacturing apparatus 101 is configured in such a way as to fill the inside of the body cavity 121 with the resin material 108, after an elapse of a prescribed period of time, eject the gas G into the forming mold 102 from the outer gas nozzle 104, and then, after a prescribed period of time has elapsed after the ejection, eject the gas G into the forming mold 102 from the inner gas nozzle 103.

A timing of starting the injection of the gas G into the forming mold 102 from the outer gas nozzle 104 can be after the resin material 180 fills a whole of the body cavity 121 and boss cavity 122. Also, a timing of starting the injection of the gas G into the forming mold 102 from the inner gas nozzle 103 can be, for example, after a surface portion of a molten resin, which makes contact with a surface of the forming mold 102, starts to cure, and starts forming a surface skin (a cured portion). The timing of starting the injection of the gas G from the inner gas nozzle 103 can be, for example, when one to five seconds have elapsed after the start of the injection of the gas G from the outer gas nozzle 104.

As shown in FIG. 11, the inner gas nozzle 103 includes a gap 343A, through which the gas G is caused to pass, formed between a gas passage hole 341A formed in the inner molding wall 123 forming the inner periphery 331 of the boss cavity 122 and a cylindrical body 342A disposed in the gas passage hole 341A. Also, the outer gas nozzle 104 includes a gap 343B, through which the gas G is caused to pass, formed between a gas passage hole 341B formed in the rear molding surface 302 of the body cavity 121 and a cylindrical body 342B disposed in the gas passage hole 341B.

The outer gas nozzle 104 of the second embodiment is formed in one portion in the body cavity 121. In contrast, it is also possible that the outer gas nozzles 104 are formed in a plurality of portions of the body cavity 121.

Also, as shown in FIG. 10, a projecting wall 911, which projects from a rear surface 902 of the plate-like body 181 of the resin molded article 8 to be molded in the second embodiment, is formed around the plate-like body 181. Then, a whole perimeter of the rear surface 902 of the plate-like body 181 is surrounded by the projecting wall 911.

Also, as shown in FIG. 11, a projecting wall cavity 311 for molding the projecting wall 911 is continuously formed in the body cavity 121.

Figure 15:
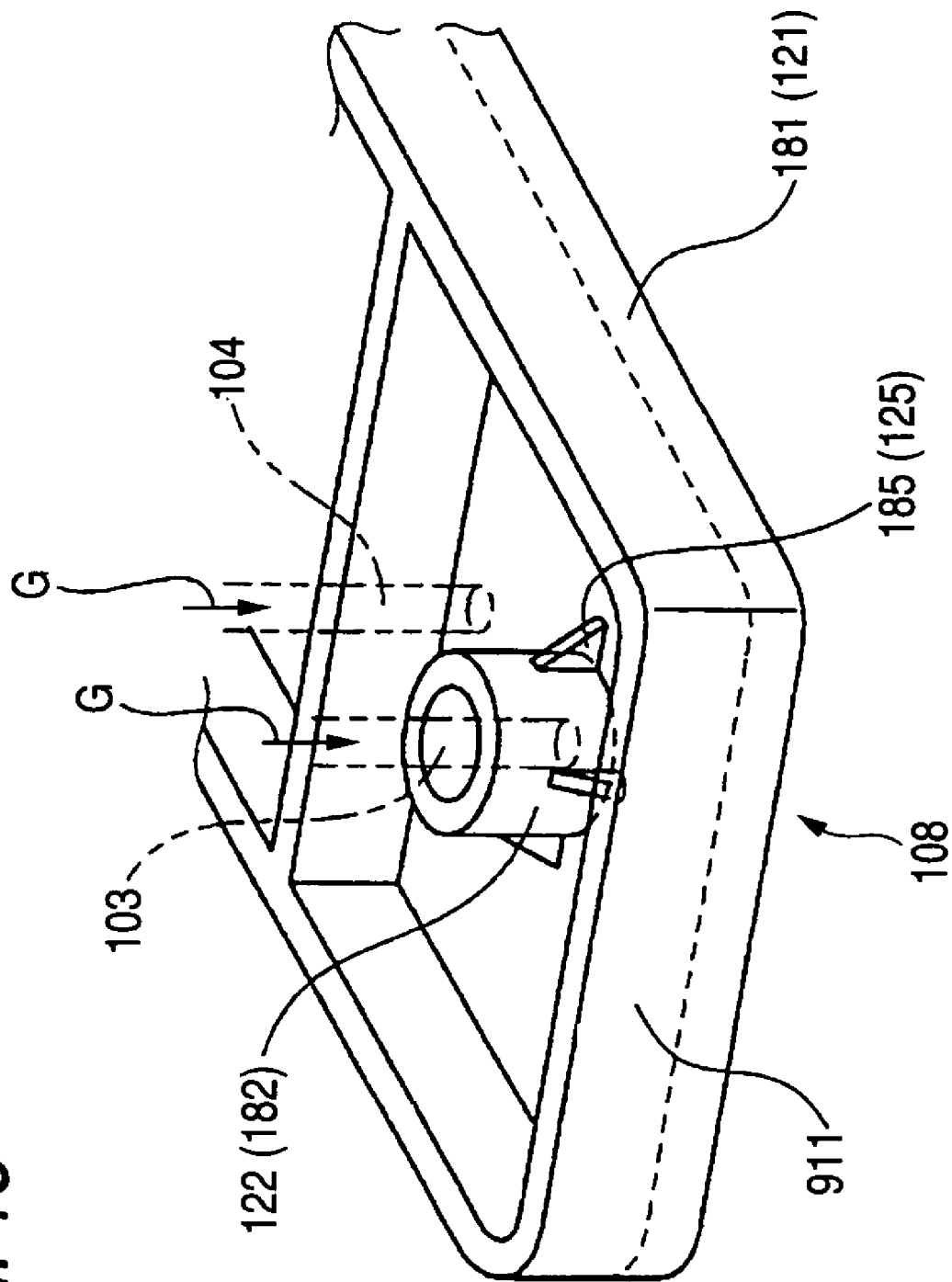
FIG. 15 is a perspective view showing another resin molded article, according to the second embodiment.

As shown in FIG. 15, a rib cavity 125 for forming a strengthening rib 185 at a base of the boss 182 can be formed at a base of an outer periphery 332 of the boss cavity 122. In this case, when filling the inside of the body cavity 121 and boss cavity 122 with the resin material 180, this resin material 180 is also caused to fill an inside of the rib cavity 125 and, in a molded resin molded article 108, the base of the boss 182 can be strengthened by the strengthening rib 185.

In the second embodiment, in manufacturing the resin molded article 108, a heated and molten resin material 180 is injected into the body cavity 121 from an injection portion (not shown) connected to the body cavity 121. Then, as shown in FIG. 12, this resin material 180 fills not only the inside of the body cavity 121, but also the inside of the projecting wall cavity 311, as well as the inside of the boss cavity 122.

To continue, as shown in FIG. 13, the gas G is injected from the outer gas nozzle 104 into the area between the rear molding surface 302 of the body cavity 121 and the resin material 180 which has filled the inside of the body cavity 121. At this time, this gas G spreads from an installation position of the outer gas nozzle 104 to an area between the rear molding surface 302 of the body cavity 121 and the resin material 180 facing the rear molding surface 302. Then, the gas G is prevented, by the resin material 180 having filled the inside of the body cavity 122, from entering an area between the outer periphery 332 of the boss cavity 122 and the resin material 180 facing the outer periphery 332. Also, the gas G is prevented, by the resin material 180 having filled an inside of the projecting wall cavity 311, from entering up to the front molding surface 301 of the body cavity 121.

In this way, as shown in the same figure, by the gas G injected into the rear molding surface 302 of the body cavity 121, the resin material 180 inside the body cavity 121 is pressed against the front molding surface 301 of the body cavity 121.

To continue, as shown in FIG. 14, after the prescribed period of time has elapsed after the start of the injection of the gas G from the outer gas nozzle 104, the gas G is injected from the inner gas nozzle 103 into the area between the leading end surface 333 of the inner molding wall 123 and the resin material 180 facing the leading end surface 333. By this time, a part of the resin material 180 facing the leading end surface 333 of the inner molding wall 123 has already started to cure, and started forming a surface skin. For that reason, the gas G injected from the inner gas nozzle 103, without entering an inside of the resin material 180 inside the body cavity 121, stays between the leading end surface 333 of the inner molding wall 123 and the surface skin on the resin material 180 facing the leading end surface 333.

In the second embodiment, when injecting the gas G into the forming mold 102 from the inner gas nozzle 103, the injection of the gas G into the forming mold 102 from the outer gas nozzle 104 is maintained.

In this way, as shown in the same figure, the resin material 180 portion facing the leading end surface 333 of the inner molding wall 123 is pressed against the front molding surface 301 of the body cavity 121 by the gas G injected into the leading end surface 333 of the inner molding wall 123.

In this way, in the second embodiment, in a condition in which the resin material 180 positioned farther to an outer peripheral side than the boss cavity 122 is pressed against the front molding surface 301 of the body cavity 121, the resin material 180 facing the leading end surface 333 of the inner molding wall 123 (the resin material 180 positioned on an inner peripheral side of the boss cavity 122) can be pressed against the front molding surface 301 of the body cavity 121.

Therefore, in the resin molded article 108 molded by the manufacturing method of the second embodiment, a state of strain such as a shrink can be effectively prevented from occurring on the front surface 901 corresponding to a whole of a boss 82 formation position.

Comparative Examples

Figure 16:
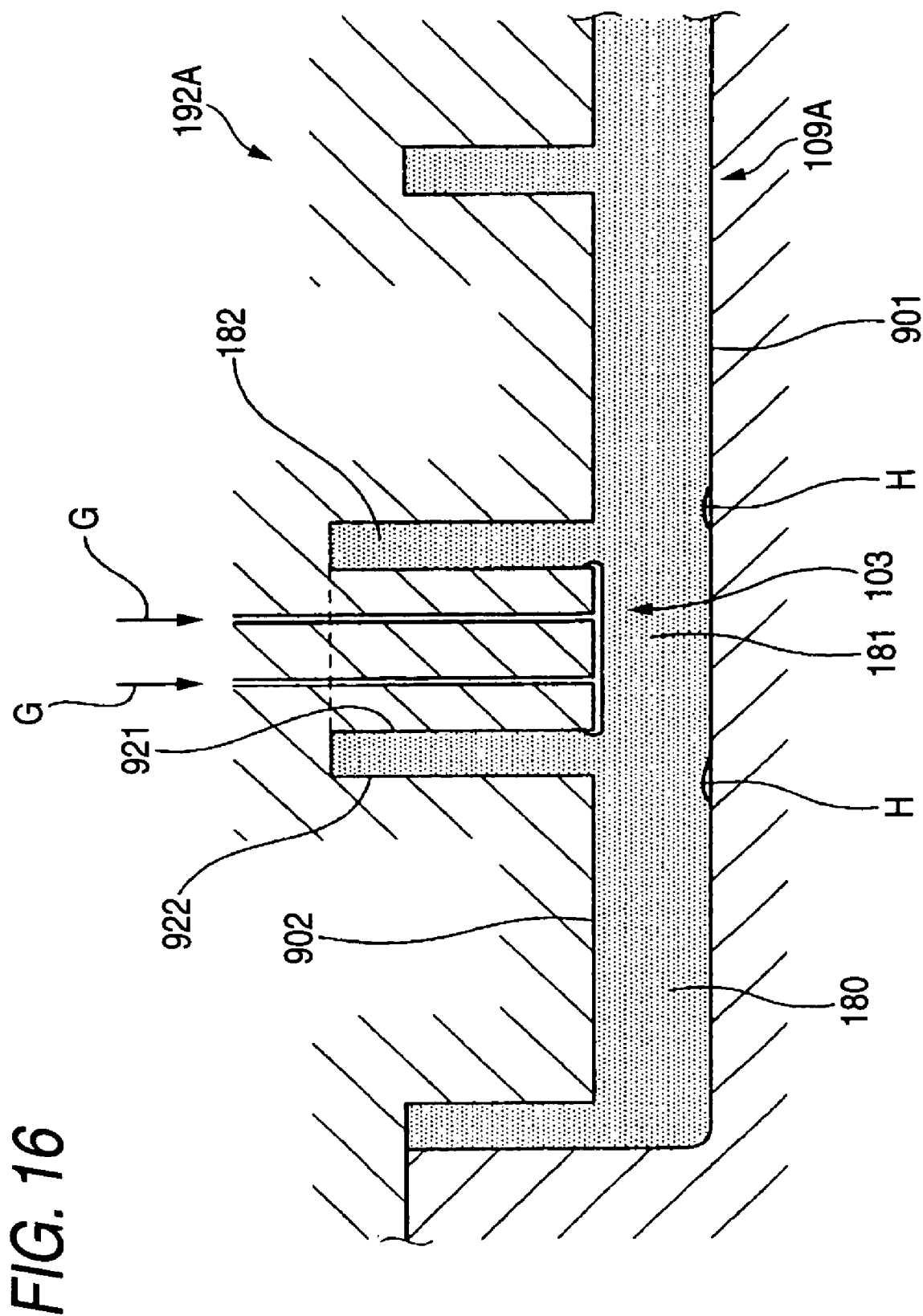
FIG. 16 is a sectional view showing the manufacturing apparatus in a condition in which the gas is injected from only the inner gas nozzle, and a shrink has occurred, according to a comparative example 1.
Figure 17:
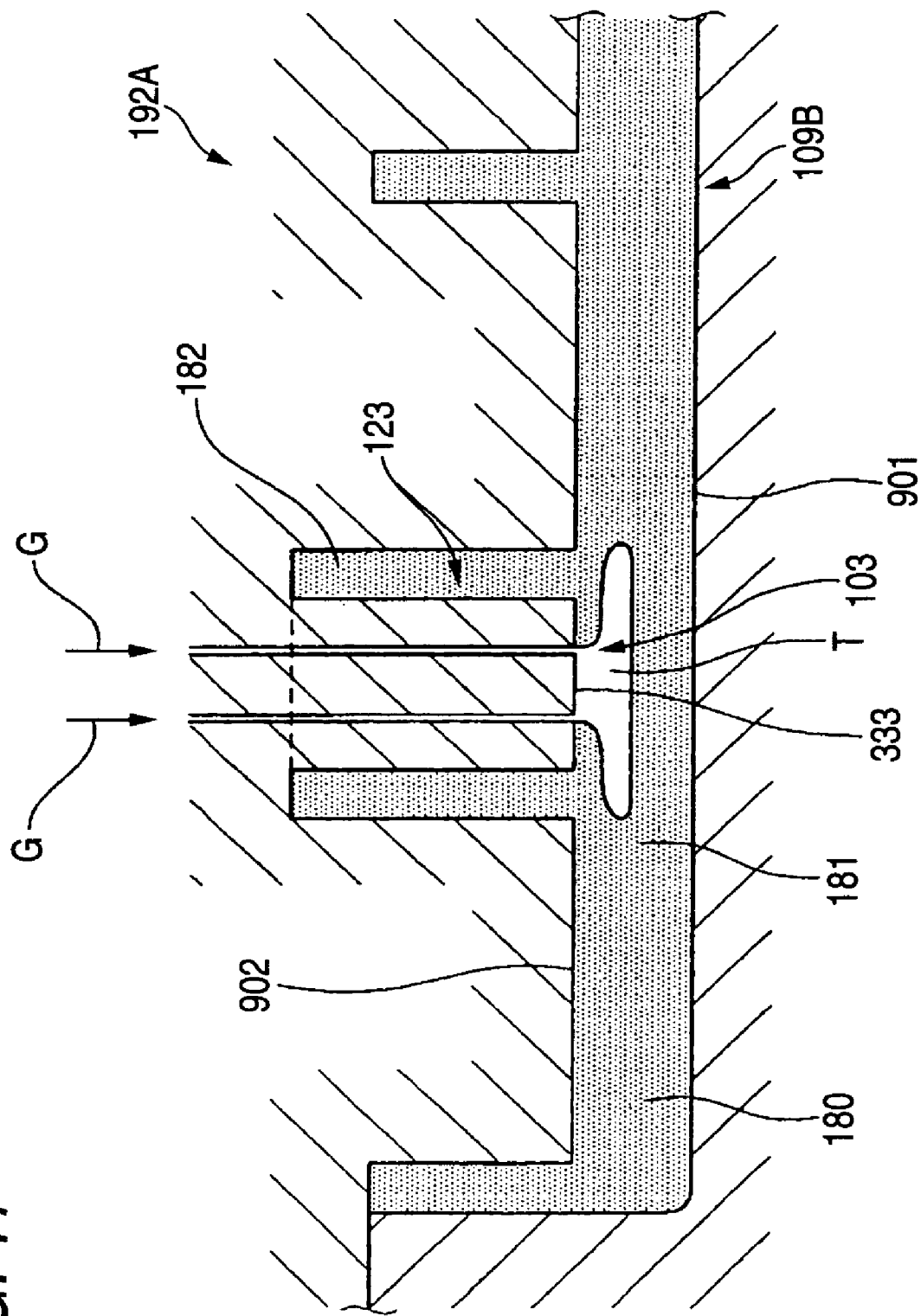
FIG. 17 is a sectional view showing the manufacturing apparatus in a condition in which the gas is injected from only the inner gas nozzle, and a hollow portion has been formed, according to the comparative example 1.
Figure 18:
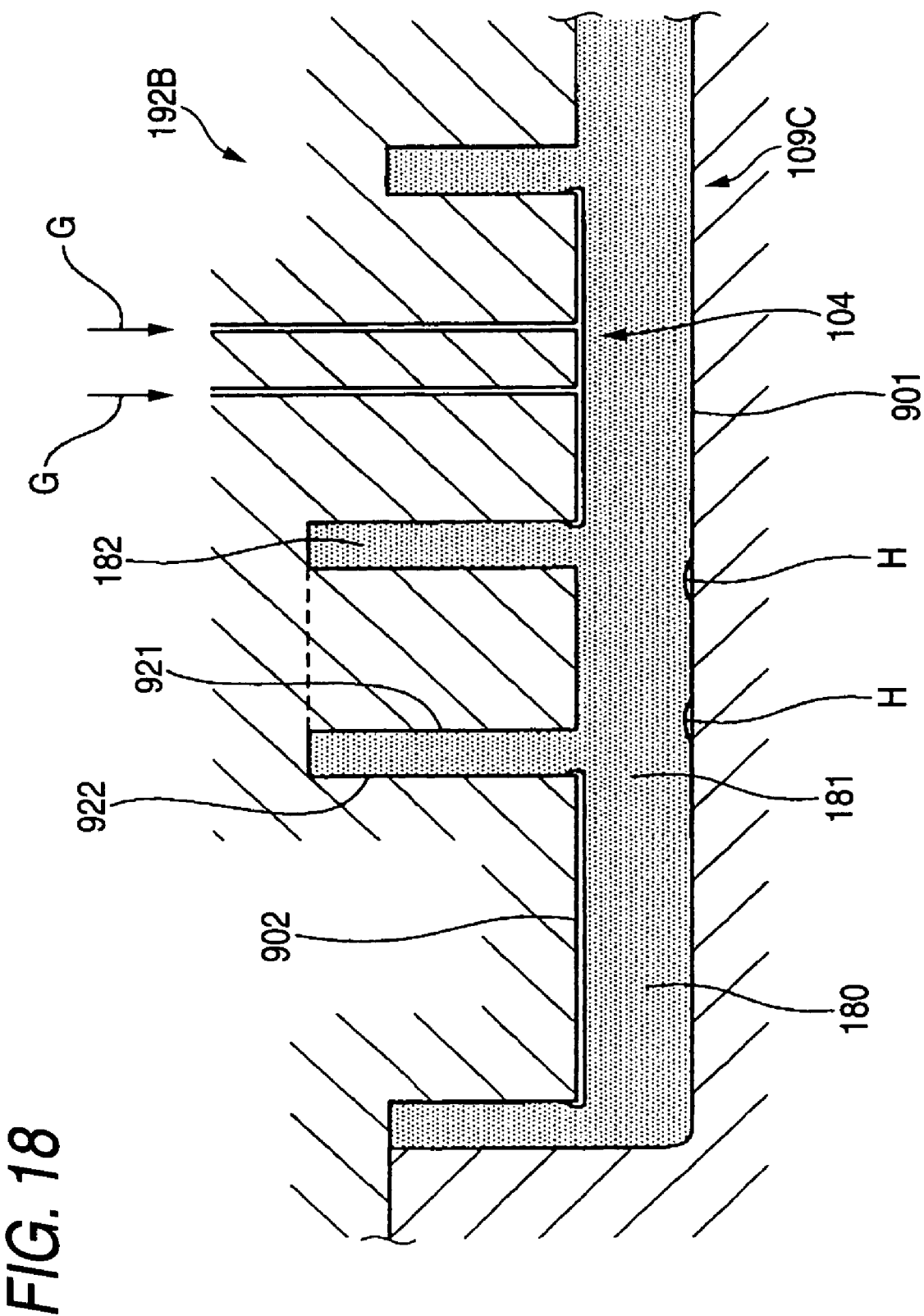
FIG. 18 is a sectional view showing the manufacturing apparatus in a condition in which the gas is injected from only the outer gas nozzle, and the shrink has occurred, according to a comparative example 2.

In the comparative examples, a condition is shown in which a state of strain such as a shrink has occurred in molding the resin molded article 108, as shown in FIGS. 16 and 17, in a case of not injecting the gas G into a forming mold 192A from the outer gas nozzle 104, but injecting the gas G into the forming mold 192A from only the inner gas nozzle 103 (a comparative example 1) and, as shown in FIG. 18, in a case of injecting the gas G into a forming mold 192B from only the outer gas nozzle 104, and not injecting the gas G into the forming mold 192B from the inner gas nozzle 103 (a comparative example 2).

Also, as shown in FIG. 16, in the case of the comparative example 1, in a molded resin molded article 109A, although no shrink or the like has occurred in a position of the front surface 901 corresponding to a resin portion positioned on an inner peripheral side 921 of the boss 182, a shrink H has occurred in a position of the front surface 901 corresponding to a resin portion positioned close to an outer peripheral side 922 of the boss 182.

Also, as shown in FIG. 17, in the case of the comparative example 1, it is found that, in the event that the gas G is injected early into the forming mold 102 from the inner gas nozzle 103 (in a case in which the injection of the gas G is carried out before a surface skin is formed on the resin material 180 facing the leading end surface 333 of the inner molding wall 123), the gas G enters an inside of a molten resin material 180, and a hollow portion T is formed inside the resin material 108.

Also, as shown in FIG. 18, in the case of the comparative example 2, in the molded resin molded article 108, although no shrink or the like has occurred in the position of the front surface 901 corresponding to the resin portion positioned close to the outer peripheral side 922 of the boss 182, the shrink H has occurred in the position of the front surface 901 corresponding to the resin portion positioned on the inner peripheral side 921 of the boss 182.

It is found from these results that, in the resin molded article 108, in order to effectively prevent a state of strain such as a shrink from occurring on the front surface 901 corresponding to the whole of the boss 182 formation position, it is necessary that the resin molded article 108 manufacturing method and apparatus 101 is configured as shown in the example described heretofore.

What is claimed is:

1. An injection molding method using a forming mold provided with a cavity which is filled with a resin material to obtain a resin molded article and a resin inlet through which the resin material is introduced into the cavity, wherein a plurality of gas inlets through which a gas is introduced are formed on a rear molding surface of the cavity for molding a rear surface of the resin molded article, and the gas is introduced into an area between the rear molding surface and the resin material inside the cavity, the injection molding method comprising the steps of:

introducing the resin material into the cavity from the resin inlet; and pressing the resin material against a front molding surface of the cavity for molding a front surface of the resin molded article by introducing the gas to the gas inlets when the cavity is filled with the resin material, wherein a gas inlet positioned close to the resin inlet starts an introduction of the gas earlier than a gas inlet positioned far from the resin inlet, wherein the resin molded article includes an elongated plate and a standing wall extending from a rear surface of the elongated plate, the elongated plate includes a plurality of elongated body components, a longitudinal direction of each of the body components extends in a longitudinal direction of the elongated plate, the cavity includes a body cavity for molding the elongated plate and a standing wall cavity for molding the standing wall, the body cavity is formed with a plurality of elongated closed spaces which are areas surrounded by the standing wall cavity, the closed spaces include an intermediate closed space arranged between a central closed space and a distal closed space, a longitudinal direction of each of the closed spaces extends in the longitudinal direction of the plate, a passageway length of the resin material from the resin inlet increases in an order of the central closed space, the intermediate closed space and the distal closed space, a plurality of the gas inlets are provided corresponding to portions of the rear molding surface in the plurality of closed spaces, the resin material is introduced into the cavity from the resin inlet, and flows of the resin material into the cavity including the central closed space, the intermediate closed space and the distal closed space from the corresponding resin inlets converge at ends of the cavity in a right-left direction, when an inside of each of the closed spaces is filled with the resin material, a gas inlet provided in the closed space positioned close to the resin inlet starts an introduction of the gas earlier than a gas inlet provided in the closed space positioned far from the resin inlet, and introduction of the gas through the gas inlets is started after an inside of at least one of the closed spaces is filled with the resin material and before a whole of the cavity is filled with the resin material.

2. An injection molding method, using a forming mold provided with a cavity which is filled with a resin material to obtain a resin molded article and a resin inlet through which the resin material is introduced into the cavity, wherein one or a plurality of gas inlets through which a gas is introduced is formed on a rear molding surface of the cavity for molding a rear surface of the resin molded article and the gas is introduced into an area between the rear molding surface and the resin material inside the cavity, the injection molding method comprising the steps of:

introducing the resin material into the cavity from the resin inlet; and pressing the resin material against a front molding surface of the cavity for molding a front surface of the resin molded article by starting introducing the gas from at least one of the gas inlets while the resin material is flowing into the cavity, wherein the resin molded article includes an elongated plate and a standing wall extending from a rear surface of the elongated plate, the elongated plate includes a plurality of elongated body components, a longitudinal direction of each of the body components extends in a longitudinal direction of the elongated plate, the cavity includes a body cavity for molding the elongated plate and a standing wall for molding the standing wall, the body cavity is formed with a plurality of elongated closed spaces which are areas surrounded by the standing wall cavity, the closed spaces include an intermediate closed space arranged between a central closed space and a distal closed space, a longitudinal direction of each of the closed spaces extends in the longitudinal direction of the plate, a passageway length of the resin material from the resin inlet increases in an order of the central closed space, the intermediate closed space and the distal closed space, a plurality of the gas inlets are provided corresponding to portions of the rear molding surface in the plurality of closed spaces, and flows of the resin material into the cavity including the central closed space, the intermediate closed space and the distal closed space from the corresponding resin inlets converge at ends of the cavity in a right-left direction, and the introduction of the gas is started after the resin material flowing inside the cavity fills one of the closed spaces and before the whole of the cavity is filled with the relevant resin material.

3. An injection molding apparatus, comprising a forming mold provided with a cavity which is filled with a resin material to obtain a resin molded article and a resin inlet through which the resin material is introduced into the cavity, wherein a gas inlet through which a gas is introduced is formed on a rear molding surface of the cavity for molding a rear surface of the resin molded article, and the gas is introduced into an area between the rear molding surface and the resin material inside the cavity, a plurality of the gas inlets are provided along a passage direction of the resin material in the cavity, and the apparatus is configured such that the resin material is introduced into the cavity from the resin inlet, and an introduction of the gas through the plurality of gas inlets is sequentially started, beginning with the gas inlet provided in an area inside the cavity which is first filled with the resin material, the resin molded article includes an elongated plate and a standing wall extending from a rear surface of the elongated plate, the elongated plate includes a plurality of elongated body components, a longitudinal direction of each of the body components extends in a longitudinal direction of the elongated plate, the cavity includes a body cavity for molding the elongated plate and a standing wall cavity for molding the standing wall, the body cavity is formed with a plurality of elongated closed spaces which are areas surrounded by the standing wall cavity and the closed spaces are connected together at ends of the cavity, a longitudinal direction of each of the closed spaces extends in the longitudinal direction of the plate, a plurality of the gas inlets are provided corresponding to portions of the rear molding surface in the plurality of closed spaces, the apparatus is configured such that the resin material is introduced into the cavity from the resin inlet and, when an inside of each of the closed spaces is filled with the resin material, an introduction of the gas is sequentially started, beginning with the gas inlet provided in the closed space that is first filled with the resin material, the apparatus is configured such that the introduction of the gas through the gas inlet is started after the resin material fills the inside of the closed space provided with the gas inlet and before the resin material fills the inside of the next closed space, and the apparatus is configured such that the introduction of the gas through the gas inlets is sequentially started, beginning with the gas inlet located in an area having a short passageway length of the resin material from the resin inlet.

* * * * *